United States Patent
Echigo et al.

(10) Patent No.: US 11,978,937 B2
(45) Date of Patent: May 7, 2024

(54) ELECTROCHEMICAL ELEMENT, ELECTROCHEMICAL MODULE, ELECTROCHEMICAL DEVICE, AND ENERGY SYSTEM

(71) Applicant: Osaka Gas Co., Ltd., Osaka (JP)

(72) Inventors: Mitsuaki Echigo, Osaka (JP); Hisao Ohnishi, Osaka (JP); Osamu Yamazaki, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 0 days.

(21) Appl. No.: 16/086,190

(22) PCT Filed: Mar. 16, 2017

(86) PCT No.: PCT/JP2017/010696
§ 371 (c)(1),
(2) Date: Sep. 18, 2018

(87) PCT Pub. No.: WO2017/159794
PCT Pub. Date: Sep. 21, 2017

(65) Prior Publication Data
US 2019/0341640 A1 Nov. 7, 2019

(30) Foreign Application Priority Data
Mar. 18, 2016 (JP) .................................. 2016-056239

(51) Int. Cl.
*H01M 8/1213* (2016.01)
*H01M 8/0206* (2016.01)
(Continued)

(52) U.S. Cl.
CPC ....... *H01M 8/1213* (2013.01); *H01M 8/0206* (2013.01); *H01M 8/0228* (2013.01);
(Continued)

(58) Field of Classification Search
CPC ............. H01M 8/1213; H01M 8/0606; H01M 8/0206; H01M 2008/1293; H01M 8/2432;
(Continued)

(56) References Cited

U.S. PATENT DOCUMENTS 5,882,809 A * 3/1999 McPheeters ........ H01M 8/2404
264/618
6,280,868 B1 * 8/2001 Badwal ............... H01M 8/0206
429/487
(Continued)

FOREIGN PATENT DOCUMENTS

GB 2524643 A 9/2015
JP 434860 A 2/1992
(Continued)

*Primary Examiner* — Amanda J Barrow
(74) *Attorney, Agent, or Firm* — The Webb Law Firm

(57) ABSTRACT

An electrochemical element (Q) has a metal substrate (1) and multiple electrochemical reaction portions. The metal substrate (1) has gas flow allowing regions that allow the flowing of a gas between the upper side (4) and the lower side (5) of the metal substrate (1). The electrochemical reaction portions each have at least an electrode layer (A), an electrolyte layer (B), and a counter electrode layer (C), and are arranged on the upper side (4) of the metal substrate (1). The electrolyte layer (B) is arranged between the electrode layer (A) and the counter electrode layer (C), and the gas flowing through the gas flow allowing regions is supplied to the electrode layer (A).

14 Claims, 18 Drawing Sheets

(51) Int. Cl.
  *H01M 8/0228* (2016.01)
  *H01M 8/0606* (2016.01)
  *H01M 8/1246* (2016.01)
  *H01M 8/12* (2016.01)

(52) U.S. Cl.
  CPC ....... *H01M 8/0606* (2013.01); *H01M 8/1246* (2013.01); *H01M 2008/1293* (2013.01)

(58) Field of Classification Search
  CPC .... H01M 8/2418; H01M 8/2425; H01M 8/10; H01M 8/1007; H01M 8/12; H01M 8/1231; H01M 8/0204; H01M 8/0254; H01M 8/026; H01M 8/1097; H01M 8/1226
  See application file for complete search history.

(56) References Cited

U.S. PATENT DOCUMENTS

| | | | | |
|---|---|---|---|---|
| 6,794,075 B2* | 9/2004 | Steele | ................... | H01M 8/026 |
| | | | | 429/465 |
| 7,829,213 B2* | 11/2010 | Jacobson | ............ | H01M 8/2483 |
| | | | | 429/128 |
| 8,546,041 B2* | 10/2013 | Omersa | ............... | H01M 8/2432 |
| | | | | 429/465 |
| 2005/0287402 A1 | 12/2005 | Maly et al. | | |
| 2006/0194088 A1 | 8/2006 | Kabumoto | | |
| 2007/0134539 A1* | 6/2007 | Chung | ................ | H01M 8/0247 |
| | | | | 429/456 |
| 2007/0243447 A1* | 10/2007 | Jang | .................... | H01M 8/0273 |
| | | | | 429/510 |
| 2008/0206619 A1* | 8/2008 | Imura | ................. | H01M 8/2418 |
| | | | | 29/854 |
| 2011/0256463 A1* | 10/2011 | Michalske | ........... | H01M 8/241 |
| | | | | 29/623.1 |
| 2011/0269047 A1* | 11/2011 | Tucker | ................ | H01M 4/9033 |
| | | | | 429/522 |
| 2012/0070756 A1 | 3/2012 | Yoshida | | |
| 2013/0252074 A1* | 9/2013 | Hsiao | .................. | H01M 10/425 |
| | | | | 429/159 |
| 2014/0255780 A1* | 9/2014 | Mikhaylik | .............. | H01M 6/14 |
| | | | | 429/231.95 |
| 2014/0295242 A1* | 10/2014 | Kimura | ............. | H01M 10/6554 |
| | | | | 429/120 |
| 2014/0321093 A1* | 10/2014 | Pande | .................... | H01G 11/84 |
| | | | | 29/25.03 |
| 2016/0233524 A1 | 8/2016 | Leah et al. | | |
| 2018/0166729 A1* | 6/2018 | Yajima | ................ | H01M 8/2425 |
| 2019/0051915 A1* | 2/2019 | Yonezawa | ........... | H01M 8/0271 |

FOREIGN PATENT DOCUMENTS

| | | | |
|---|---|---|---|
| JP | 2004303508 A | | 10/2004 |
| JP | 2005166470 A | * | 6/2005 |
| JP | 2010272449 A | | 12/2010 |
| JP | 201238696 A | | 2/2012 |
| JP | 201269299 A | | 4/2012 |
| JP | 201377450 A | | 4/2013 |
| JP | 2014232678 A | | 12/2014 |
| JP | 2015167128 A | | 9/2015 |
| JP | 201633874 A | | 3/2016 |

* cited by examiner

ELECTROCHEMICAL ELEMENT, ELECTROCHEMICAL MODULE, ELECTROCHEMICAL DEVICE, AND ENERGY SYSTEM

CROSS-REFERENCE TO RELATED APPLICATIONS

This application is the United States national phase of International Application No. PCT/JP2017/010696 filed Mar. 16, 2017, and claims priority to Japanese Patent Application No. 2016-056239 filed Mar. 18, 2016, the disclosures of which are hereby incorporated in their entirety by reference.

TECHNICAL FIELD

The present invention relates to an electrochemical element, an electrochemical module, an electrochemical device, and an energy system.

BACKGROUND ART

Development is underway for a structure for a conventional solid oxide fuel cell (hereinafter, called an "SOFC") in which the support substrate is mainly made of a ceramic material. In order to improve the performance of an SOFC, development is underway for an SOFC in which multiple power generating bodies are arranged side-by-side on a single support substrate.

Patent Document 1 discloses a so-called "horizontal stripe" type of SOFC in which the support substrate is a plate-shaped sintered body that is constituted by a porous material made of CSZ (calcia-stabilized zirconia), which is a ceramic, and also in which multiple multi-layer bodies (power generating bodies), which are constituted by a fuel electrode, a solid electrolyte film, a reaction preventing film, and an air electrode, are arranged on the one support substrate.

PRIOR ART DOCUMENTS

Patent Documents

Patent Document 1: JP 2012-38696A

DISCLOSURE OF THE INVENTION

Problem to be Solved by the Invention

If a ceramic that is expensive and easily breakable is used as the support substrate, the thickness of the support substrate needs to be increased considerably in order to provide a certain extent of strength, thus leading to the problems of an increase in cost and an increase in size and weight as well. There are also problems in that when a ceramic support substrate is used, it is difficult to perform fine processing such as arranging multiple power generating bodies side-by-side on a single support substrate, and in that the processing cost also rises.

The present invention was achieved in light of the foregoing problems, and an object of the present invention is to provide an electrochemical element that suppresses the material cost and the processing cost, while also being compact and high-performance, and having excellent strength and reliability.

Means for Solving Problem

A characteristic configuration of an electrochemical element according to the present invention for achieving the objects includes: a metal substrate and a plurality of electrochemical reaction portions,
wherein the metal substrate has a gas flow allowing region that allows flowing of a gas between a upper side and a lower side of the metal substrate,
the electrochemical reaction portion has at least an electrode layer, an electrolyte layer, and a counter electrode layer, and is arranged on the upper side of the metal substrate,
the electrolyte layer is arranged at least between the electrode layer and the counter electrode layer, and
the gas flowing through the gas flow allowing region is supplied to the electrode layer.

According to the above characteristic configuration, multiple electrochemical reaction portions are arranged on the metal substrate that has sufficient strength even while being thin, thus making it possible to obtain an electrochemical element that is compact, has high performance, and has excellent strength and reliability, while also suppress material cost and processing cost.

In another characteristic configuration of the electrochemical element according to the present invention, the metal substrate has a plurality of the gas flow allowing regions that are separated from each other, and the electrolyte layer of the electrochemical reaction portion is arranged so as to cover at least each of the gas flow allowing regions or at least a portion of the electrode layers provided in the gas flow allowing regions.

According to the above characteristic configuration, even if multiple electrochemical elements are arranged side-by-side on the metal substrate, it is possible to perform gas sealing with use of the gas-tight electrolyte layer, thus making it possible to obtain an electrochemical element that is compact, has high performance, and has excellent strength and reliability. Specifically, the electrolyte layer is arranged so as to cover at least each of the gas flow allowing regions or the electrode layers provided in the gas flow allowing regions, thus making it possible to suppress the case where the gas supplied from the lower side of the metal substrate to the electrode layer via the gas flow allowing regions leaks to the upper side of the metal substrate, and making it possible to raise the performance and the reliability of the electrochemical element, and thus is favorable.

In another characteristic configuration of the electrochemical element according to the present invention, on/over the upper side of the metal substrate, a metal oxide film is formed in at least a region where the metal substrate and the electrode layer are in contact.

According to the above characteristic configuration, due to the metal oxide film, it is possible to suppress the case where a component such as Cr disperse from the metal substrate into the electrode layer, thus making it possible to suppress a reduction in the performance of the electrochemical reaction portion and also raise the performance of the electrochemical reaction portion.

In another characteristic configuration of the electrochemical element according to the present invention, on/over the upper side of the metal substrate, a metal oxide film is formed in at least a region that is covered by neither the electrode layer, the electrolyte layer, nor the counter electrode layer.

According to the above characteristic configuration, due to the metal oxide film, it is possible to suppress the case where a component such as Cr oxide in the metal substrate to vaporize, react with the counter electrode layer or the like, and produce a high-resistance component, thus making it possible to suppress a reduction in the performance of the electrochemical reaction portion, and to raise the performance of the electrochemical reaction portion.

In another characteristic configuration of the electrochemical element according to the present invention, the metal oxide film is an oxide that contains at least a metal element included in the metal substrate.

According to the above characteristic configuration, the upper surface of the metal substrate can be oxidized to form the metal oxide film as well in the step of forming the electrochemical reaction portion, such as the electrode layer, on the metal substrate, thus making it possible to omit a step of separately forming the metal oxide film, and making it possible to reduce material cost and processing cost.

In another characteristic configuration of the electrochemical element according to the present invention, the metal oxide film is an insulating film.

According to the above characteristic configuration, the metal substrate and the electrode layer are insulated from each other by the film that has an electrical insulating characteristic, thus making it possible to suppress the conduction of electrical between the plurality of electrochemical reaction portions via the metal substrate. Accordingly, in the case where the electrochemical reaction portions formed on the metal substrate are connected in series, it is possible to suppress the leakage current from the electrochemical reaction portions to the metal substrate, thus making it possible to raise the performance of the electrochemical reaction portions. Also, in the case where the electrochemical reaction portions formed on the metal substrate are connected in parallel, an electrical conduction path may be separately provided between the metal substrate and the electrode layer.

In another characteristic configuration of the electrochemical element according to the present invention, the metal substrate contains at least one of Si, Al, and a 2 to 12 group element.

According to the above characteristic configuration, easy processing such as heating in air can be used to form the insulating film that contains silica, alumina, or a 2 to 12 group element oxide on the upper surface of the metal substrate, thus making it possible to obtain a low-cost electrochemical element that suppresses material cost and manufacturing cost. Note that, for example, if the material forming the metal substrate is a metal material containing at least one of Si and Al at approximately 1 wt % to 5 wt %, this is preferable due to being able to easily form the insulating film on the upper surface thereof by heating treatment. Also, if the material forming the metal substrate is a metal material containing at least one of Si and Al at approximately 3 wt % to 5 wt %, this is more preferable due to being able to more easily form the insulating film on the upper surface thereof by heating treatment.

In another characteristic configuration of the electrochemical element according to the present invention, the plurality of electrochemical reaction portions are electrically connected in series.

According to the above characteristic configuration, the electrochemical reaction portions are electrically connected in series, thus making it possible to simplify the structure for electrically connecting the electrochemical elements to the outside. Additionally, in the case where the electrochemical reaction portions operate as a fuel cell, by being electrically connected in series, a combination of the voltages generated by the electrochemical reaction portions can be output from the electrochemical element, and this is favorable due to being able to raise the output voltage of each electrochemical element.

Note that the plurality of electrochemical reaction portions can be electrically connected in series by electrically connecting the electrode layer of one electrochemical reaction portion to the counter electrode layer of another electrochemical reaction portion.

In another characteristic configuration of the electrochemical element according to the present invention, the plurality of electrochemical reaction portions are electrically connected in parallel.

According to the above characteristic configuration, the electrochemical reaction portions are electrically connected in parallel, thus making it possible to simplify the structure for electrically connecting the electrochemical elements to the outside. Additionally, in the case where the electrochemical reaction portions operate as a fuel cell, by being electrically connected in parallel, a combination of the current generated by the electrochemical reaction portions can be output from the electrochemical element, and this is favorable due to being able to raise the output current of each electrochemical element.

Note that the plurality of electrochemical reaction portions can be electrically connected in parallel by electrically connecting the electrode layer of one electrochemical reaction portion to the electrode layer of another electrochemical reaction portion.

In a characteristic configuration of an electrochemical module according to the present invention for achieving the objects, a plurality of any of the above-described electrochemical elements are arranged in a grouped state.

According to the above characteristic configuration, the electrochemical elements are arranged in a grouped state, thus making it possible to obtain an electrochemical module that is compact, has high performance, and has excellent strength and reliability, while also suppressing material cost and processing cost.

A characteristic configuration of an electrochemical device according to the present invention for achieving the objects includes: at least the above-described electrochemical module and a reformer, and including a fuel supply unit that supplies a fuel gas containing a reducible component to the electrochemical module.

According to the above characteristic configuration, the electrochemical device has the electrochemical module and the reformer, and has the fuel supply unit that supplies the fuel gas containing a reducible component to the electrochemical module, thus making it possible to use an existing raw fuel supply infrastructure such as city gas to extract electrical power from the electrochemical module that has excellent durability, reliability, and performance, and making it possible to realize the electrochemical device that has excellent durability, reliability, and performance. Also, it is easier to construct a system that recycles unused fuel gas discharged from the electrochemical module, thus making it possible to realize a highly efficient electrochemical device.

Another characteristic configuration of an electrochemical device according to the present invention for achieving the objects includes an inverter that extracts electrical power from the electrochemical module.

According to the above characteristic configuration, it is possible to realize a highly efficient electrochemical device that extracts electrical power from an electrochemical module.

A characteristic configuration of an energy system according to the present invention for achieving the objects includes: the above-described electrochemical device, and a waste heat management unit that reuses heat discharged from the electrochemical device.

According to the above characteristic configuration, the energy system has the electrochemical device and the waste heat management unit that reuses heat discharged from the electrochemical device, thus making it possible to realize an energy system that has excellent durability, reliability, and performance, and has excellent energy efficiency as well. Note that it is also possible to realize a hybrid system that has excellent energy efficiency by combination with a power generation system that generates power with use combustion heat from unused fuel gas discharged from the electrochemical device.

BEST MODE FOR CARRYING OUT THE INVENTION

First Embodiment

Hereinafter, an electrochemical element according to a first embodiment will be described with reference to FIG. 1. An electrochemical element Q has a metal substrate 1 and multiple electrochemical reaction portions R. The metal substrate 1 has gas flow allowing regions P that allow the flowing of a gas between a upper side 4 and a lower side 5 of the metal substrate 1. The electrochemical reaction portions R each have at least an electrode layer A, an electrolyte layer B, and a counter electrode layer C, and are arranged on the upper side 4 of the metal substrate 1. The electrolyte layer B is arranged in a portion of the region between the electrode layer A and the counter electrode layer C, and the gas flowing through the gas flow allowing regions P is supplied to the electrode layer A.

In the present embodiment, five electrochemical reaction portions R (first electrochemical reaction portion R1, second electrochemical reaction portion R2, third electrochemical reaction portion R3, fourth electrochemical reaction portion R4, and fifth electrochemical reaction portion R5) are arranged along the long sides of the metal substrate 1 on the upper surface of the rectangular metal substrate 1.

Also, in the present embodiment, the electrochemical reaction portions R are each constituted by forming three layers on the upper surface of the metal substrate 1. The first layer, which is in contact with the metal substrate 1, includes the electrode layer A, electrolyte layer B, and an insulating layer D. The second layer, which is above the first layer, includes the electrolyte layer B, the insulating layer D, and a conductive layer E. The third layer, which is above the second layer and is the uppermost layer, includes the counter electrode layer C.

The following describes the structure of the metal substrate 1 and the electrochemical reaction portions R, then describes the arrangement and detailed structure of the plurality of electrochemical reaction portions R, and describes the case where the electrochemical element Q operates as a fuel cell.

Figure 1:
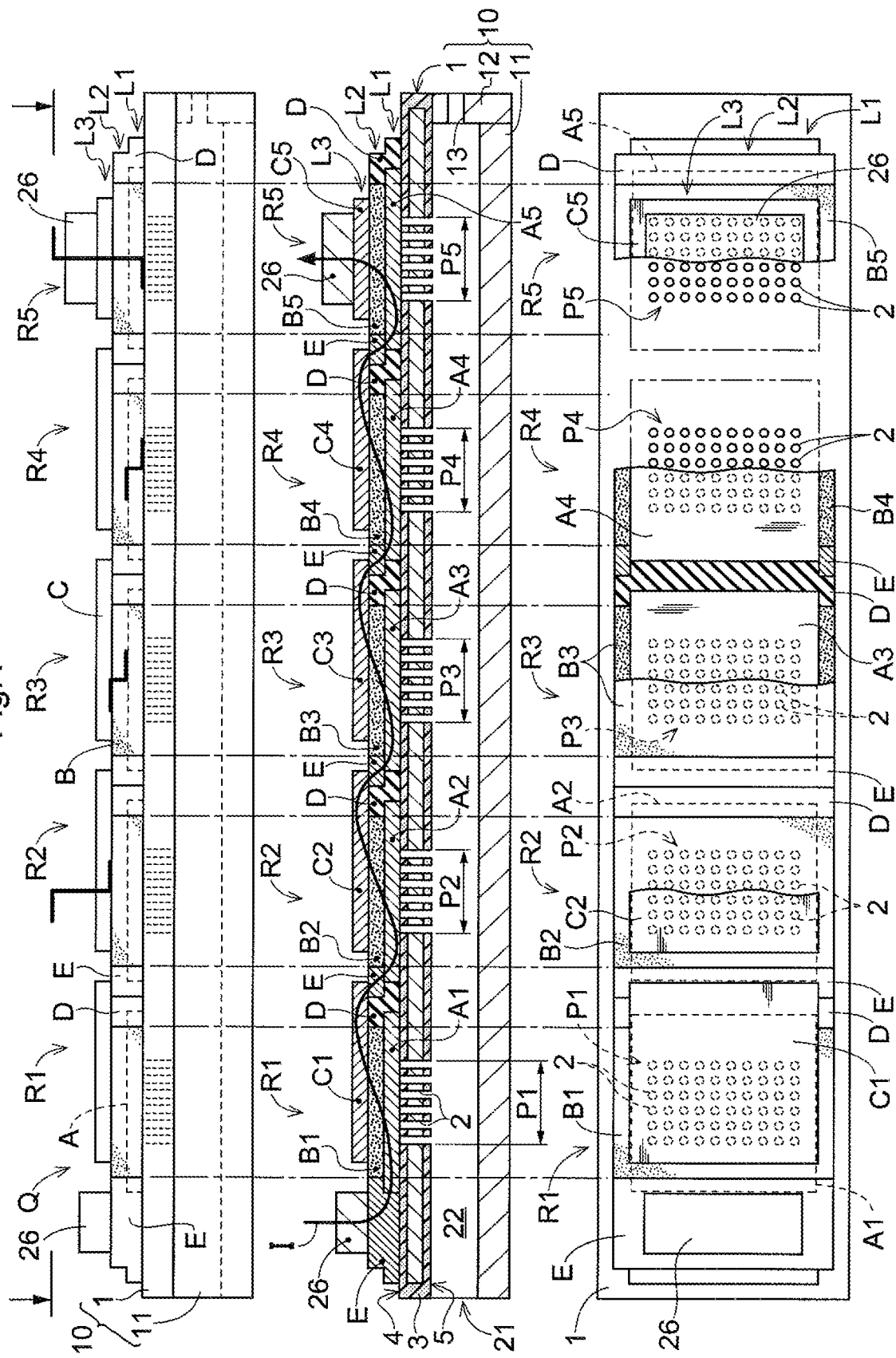
FIG. 1 is a front view and a cross-sectional view of a structure of an electrochemical element, and a top view of a multi-layer structure.

Note that the upper section in FIG. 1 is a front view of the electrochemical element Q as viewed from a direction perpendicular to the lengthwise direction thereof. The middle section in FIG. 1 is a cross-sectional view of the electrochemical element Q as viewed from the same direction as in the upper section. The lower section in FIG. 1 is a top view of the electrochemical element Q as seen from the upper side 4 of the metal substrate 1. Hereinafter, the lengthwise direction of the rectangular metal substrate 1 is sometimes simply called the "lengthwise direction", and the widthwise direction of the rectangular metal substrate 1 is sometimes simple called the "widthwise direction".

In the top view in the lower section in FIG. 1, portions of the first layer, the second layer, and the third layer have been omitted in order to describe the layer structure of the electrochemical element Q. The layer removal positions in the top view in the lower section in FIG. 1 are shown by lines (bold lines) in the front view in the upper section in FIG. 1. Specifically, in the state that is shown, the upper third layer (counter electrode layer C) has been removed from the center of the second electrochemical reaction portion R2 to the center of the third electrochemical reaction portion R3. Also, in the state that is shown, the third layer and the second layer (electrolyte layer B, insulating layer D, and conductive layer E) have been removed from the center of the third electrochemical reaction portion R3 to the center of the fourth electrochemical reaction portion R4. Moreover, in the state that is shown, the third layer, the second layer, and the first layer (electrode layer A, electrolyte layer B, and insulating layer D) have been removed from the center of the fourth electrochemical reaction portion R4 to the center of the fifth electrochemical reaction portion R5.

Metal Substrate

The metal substrate 1 is a rectangular flat plate that is made of a metal. The metal substrate 1 is provided with multiple through holes 2 that penetrate the upper side 4 and the lower side 5. A gas can flow between the upper side 4 and the lower side 5 of the metal substrate 1 through these through holes 2. In the present embodiment, the multiple through holes 2 are formed at the positions of intersections of grid lines that are parallel to the long sides and the short sides of the metal substrate 1. Note that the metal substrate 1 need only have a strength sufficient for serving as the support body for forming the electrochemical element, and can have a thickness of approximately 0.1 mm to 2 mm, preferably approximately 0.1 mm to 1 mm, and more preferably approximately 0.1 mm to 0.5 mm, for example. Also, a metal sintered body, a metal foam, or the like can be used as the metal substrate 1.

Also, five gas flow allowing regions P (first gas flow allowing region P1, second gas flow allowing region P2, third gas flow allowing region P3, fourth gas flow allowing region P4, and fifth gas flow allowing region P5), which are regions of groups of through holes 2, are formed at positions corresponding to the five electrochemical reaction portions R. In other words, in the present embodiment, the gas flow allowing regions P are constituted by the through holes 2. The five gas flow allowing regions P are formed with gaps therebetween in the lengthwise direction. The regions between the gas flow allowing regions P are regions where the flow of a gas between the upper side 4 and the lower side 5 of the metal substrate 1 is prohibited (gas flow prohibiting regions).

An insulating film 3 (metal oxide film) is formed on the upper surface of the metal substrate 1. The insulating film 3 insulates the electrode layers A of the electrochemical reaction portions R from the metal substrate 1, and thus realizes insulation from the electrode layers A of adjacent electrochemical reaction portions R. Accordingly, the insulating film 3 may be formed on/over at least the upper side of the metal substrate 1, and may be formed at least in a region of contact between the metal substrate 1 and the electrode layers A. In the present embodiment, the insulating film 3 is formed over the entire surface of the metal substrate 1. Note that as will be described later, in the present embodiment, the conductive layer E is formed adjacent to the first electrochemical reaction portion R1 in order to realize electrical connection between the electrochemical element Q and the outside. It is favorable that the insulating film 3 is also formed in the region of contact between this conductive layer E and the metal substrate 1.

The resistance value of the insulating film 3 is preferably approximately 1 k$\Omega \cdot$cm$^2$ or more, and a value of approximately 10 k$\Omega \cdot$cm$^2$ or more is favorable to be being able to ensure a sufficient electromotive force and electrical current amount even when the electrochemical element Q is operated as a fuel cell.

The insulating film 3 can be formed using various techniques, but it is favorable to use a technique of oxidizing the upper surface of the metal substrate 1 to obtain a metal oxide. Note that when using an alloy containing Cr as the members for interconnecting cells in the SOFC, in order to suppress Cr dispersion, there are cases where a diffusion preventing film is obtained by forming an oxide coating on the upper surface of the members for interconnecting cells. In such a case, the diffusion preventing film is formed as thin as possible to reduce the resistance value and thus reduce a voltage drop in the diffusion preventing film. Unlike the diffusion preventing film, the insulating film 3 of the present embodiment insulates the metal substrate 1 from the electrode layer A as described above, and is thus formed with a high resistance value in order to provide insulation from the electrode layers A of the electrochemical reaction portions R. Note that because the insulating film 3 is also a metal oxide film, it can additionally have the functionality of the diffusion preventing film (e.g., suppressing Cr dispersion).

Also, the insulating film 3 may be formed on the upper surface of the metal substrate 1 by using, for example, a PVD technique such as sputtering or PLD, a CVD technique, or a spray coating technique to form an oxide film that includes a 2 to 12 group element oxide such as silica or alumina, which have a high insulating property, or may be formed by plating or oxidation treatment.

The material forming the metal substrate 1 is a metal material having excellent heat resistance, oxidation resistance, and corrosion resistance characteristics. Examples of the material include ferrite-based stainless steel, austenite-based stainless steel, and a nickel-based alloy. It is particularly favorable to use an alloy that contains chrome. For example, in the case of using an Fe—Cr-based alloy material that contains Cr at approximately 15 wt % to 25 wt %, the coefficient of thermal expansion approaches that of the materials forming the electrode layer A and the electrolyte layer B provided thereon, and this is preferable due to being able to obtain an electrochemical element that has excellent reliability and durability. It is also possible to use a Cr-rich Cr—Fe-based alloy that contains Cr at 70 wt % or more. It is further possible to use an alloy that is Ni—Cr—Al based, Fe—Cr—Al based, or the like. In the present embodiment, it is favorable to use a material that contains at least one of Si and Al. In this case, by subjecting the metal substrate 1 to heat treatment in an air atmosphere or an oxygen partial pressure-controlled atmosphere, an insulating film 3 that has an appropriate resistance value can be favorably formed on the upper surface of the metal substrate 1. For example, if the material forming the metal substrate 1 is a metal material containing at least one of Si and Al at approximately 1 wt % to 5 wt %, this is preferable due to being able to easily form the insulating film 3 on the upper surface thereof by heating treatment. Also, if the material is a metal material containing at least one of Si, Al, and a 2 to 12 group element at approximately 3 wt % to 5 wt %, this is more preferable due to being able to more easily form the insulating film 3 on the upper surface thereof by heating treatment.

Tubular Gas Flowing Portion

In the present embodiment, a U-shaped member 11 and a cover portion 12 are joined to the metal substrate 1, thus forming a tubular gas flowing portion 10. The U-shaped member 11 is a member that has a U-shaped cross-section orthogonal to the lengthwise direction. Long sides of the metal substrate 1 and long sides of the U-shaped member 11 (the sides corresponding to the two vertices of the U shape) are joined to each other, and one end portion of the formed tube is blocked by the cover portion 12. Accordingly, the tubular gas flowing portion 10 is configured with a flat plate shape or a flat bar shape overall, with an internal space 22 inside. The metal substrate 1 is arranged parallel with the central axis of the tubular gas flowing portion 10.

Multiple holes (gas outlets 13) are formed in the cover portion 12. Also, the end portion of the tubular gas flowing portion 10 on the side opposite to the cover portion 12 is open, thus forming a gas inlet 21. Accordingly, when the electrochemical element Q operates, gas flows in through the open end portion of the tubular gas flowing portion 10, flows through the internal space 22 of the tubular gas flowing portion 10, and then flows through the gas flow allowing regions P of the metal substrate 1 and reaches the upper side 4, thus being supplied to the electrode layer A. The remaining gas flows out through the gas outlets 13 in the cover portion 12.

If the material forming the U-shaped member 11 and the cover portion 12 is the same as the material forming the metal substrate 1, this is favorable due to achieving uniform physical properties, such as the thermal expansion coefficient, for the entirety of the tubular gas flowing portion 10. Also, if ferrite-based stainless steel is used as the material forming the tubular gas flowing portion 10, including the metal substrate 1, the thermal expansion coefficient approaches that of YSZ (yttrium-stabilized zirconia), GDC (gadolinium-doped ceria; also called CGO), or the like, which is used as the material forming the electrochemical reaction portions R. Accordingly, even if low and high temperature cycling is repeated, the electrochemical element Q is not likely to be damaged. This is therefore preferable due to being able to realize an electrochemical element Q that has excellent long-term durability.

Note that the material forming the tubular gas flowing portion 10 is favorably a material having a thermal conductivity exceeding 3 $Wm^{-1}K^{-1}$, or more preferably exceeding 10 $Wm^{-1}K^{-1}$. For example, stainless steel has a thermal conductivity of approximately 15 to 30 $Wm^{-1}K^{-1}$, and thus is favorable as the material forming the tubular gas flowing portion 10.

Also, it is further desirable that the material forming the tubular gas flowing portion 10 is a high-toughness material that is resistant to brittle fracture. Metal materials have a higher toughness than ceramic materials or the like, and thus are favorable as the material forming the tubular gas flowing portion 10.

Note that in the tubular gas flowing portion 10, it is favorable that the portions of the metal substrate 1 other than the gas flow allowing regions P are configured to prevent the flow of the gas from the internal space 22 of the tubular gas flowing portion 10 to the outside. To achieve this, it is favorable that the portions of the tubular gas flowing portion 10 other than the gas flow allowing regions P are formed using a material that does not transmit gases, such as crystalline metal. On the other hand, instead of having the above-described through holes 2, the gas flow allowing regions P of the metal substrate 1 can be formed using a plate made of a porous metal.

Electrochemical Reaction Portion

The electrochemical reaction portions R according to the present embodiment each have the electrode layer A, the electrolyte layer B, the counter electrode layer C, and one or more intermediate layers.

Electrode Layer

The electrode layer A is formed as a film on the upper surface of the upper side 4 of the metal substrate 1, that is to say on the insulating film 3. The film thickness can be set to, for example, approximately 1 μm to 100 μm, or preferably approximately 5 μm to 50 μm. Due to setting this film thickness, it is possible to ensure sufficient electrode performance while also achieving cost reduction by reducing the used amount of expensive electrode layer material.

Examples of the material forming the electrode layer A include, for example, a composite material such as a material having NiO-cerium oxide (ceria) as a main component, a material having Ni-cerium oxide (ceria) as a main component, a material having NiO-zirconia as a main component, a material having Ni-zirconia as a main component, a material having CuO-cerium oxide (ceria) as a main component, and a material having Cu-cerium oxide (ceria) as a main component. Note that cerium oxide (ceria), zirconia, or the like, or a solid solution thereof doped with a heteroelement, is called the aggregate of the composite material. The electrode layer A is formed so as to have gas permeability. For example, micro pores are formed in the upper surface and interior of the electrode layer A.

The electrode layer A is preferably formed using low-temperature heating (e.g., not performing heating treatment at a high temperature such as 1400° C., but rather performing a wet process using heating treatment at a low temperature of approximately 1100° C. or lower for example), a PVD technique such as sputtering or pulse laser deposition, a CVD technique, a spray coating technique, or the like. Due to these processes that can be used in a low temperature range, a favorable electrode layer A is obtained by performing treatment in a low temperature range of approximately 1100° C. or lower for example, without using heating in a high temperature range of 1400° C. or the like. This is preferable due to being able to suppress damage to the metal substrate 1 caused by high-temperature heating, suppress element interdiffusion between the metal substrate 1 and the electrode layer A caused by high-temperature heating, and realize an electrochemical element Q that has excellent durability.

Electrolyte Layer

The electrolyte layer B is provided as a film between the electrode layer A and the counter electrode layer C. The film thickness can be set to, for example, approximately 1 μm to 50 μm, preferably approximately 1 μm to 20 μm, or more preferably approximately 2 μm to 10 μm. Due to setting this film thickness, it is possible to ensure sufficient electrolyte performance while also achieving cost reduction by reducing the used amount of expensive electrolyte layer material.

The material forming the electrolyte layer B can be a solid electrolyte material that can transmit oxide ions or hydrogen ions, such as any of various zirconia-based materials or cerium oxide-based materials, or any of various perovskite-based complex oxides. In particular, it is favorable to use a zirconia-based ceramic. If a zirconia-based ceramic is used as the electrolyte layer B, the temperature can be set higher during operation of the electrochemical element Q than when using a ceria-based based, and it is possible to constitute an extremely highly efficient electrochemical element Q.

The electrolyte layer B is preferably formed using low-temperature heating (e.g., not performing heating treatment at a high temperature such as 1400° C., but rather performing a wet process using heating treatment at a low temperature of approximately 1100° C. or lower for example), a PVD technique such as sputtering or pulse laser deposition, a CVD technique, a spray coating technique, or the like. Due to these film formation processes that can be used in a low temperature range, a dense and highly airtight electrolyte layer B is obtained by performing treatment in a low temperature range of approximately 1100° C. or lower for example, without using heating in a high temperature range of 1400° C. or the like. This is preferable due to being able to suppress damage to the metal substrate 1 caused by high-temperature heating, suppress element interdiffusion between the metal substrate 1 and the electrode layer A caused by high-temperature heating, and realize an electrochemical element Q that has excellent durability.

The electrolyte layer B is given a dense configuration in order to keep air-tightness. Note that a layer having a relative density of 90% or higher is preferably contained in the electrolyte layer B. Also, it is more preferable to contain a layer having a relative density of 95% or higher, and further preferable to use a layer having a relative density of 98% or higher in the electrolyte layer B. In this way, raising the relative density makes it possible to obtain a dense electrolyte layer B. Note that here, "relative density" represents the ratio of the density of the electrolyte layer B that is actually formed to the theoretical density of an electrolyte material.

Counter Electrode Layer

The counter electrode layer C is provided as a film on the electrolyte layer B. The film thickness can be set to, for example, approximately 1 μm to 100 μm, or preferably approximately 5 μm to 50 μm. Due to setting this film thickness, it is possible to ensure sufficient counter electrode performance while also achieving cost reduction by reducing the used amount of expensive counter electrode layer material.

The material forming the counter electrode layer C can be a complex oxide such as LSCF (La—Sr—Co—Fe-based oxide), LSC (La—Sr—Co-based oxide), LSM (La—Sr—Mn-based oxide), SSC (Sm—Sr—Co-based oxide), or SDC (Ce—Sm-based oxide). Note that the counter electrode layer C is preferably formed using low-temperature heating (e.g., not performing heating treatment at a high temperature such as 1400° C., but rather performing a wet process using heating treatment at a low temperature of approximately 1100° C. or lower for example), a PVD technique such as sputtering or pulse laser deposition, a CVD technique, a spray coating technique, or the like. Due to these processes that can be used in a low temperature range, a favorable counter electrode layer C is obtained by performing treatment in a low temperature range of approximately 1100° C. or lower for example, without using heating in a high temperature range of 1400° C. or the like. This is preferable due to being able to suppress damage to the metal substrate 1 caused by high-temperature heating, suppress element interdiffusion between the metal substrate 1 and the electrode layer A caused by high-temperature heating, and realize an electrochemical element Q that has excellent durability.

Intermediate Layer

Note that an intermediate layer may be formed as a film between the electrode layer A and the electrolyte layer B. The film thickness can be set to, for example, approximately 1 μm to 100 μm, preferably approximately 2 μm to 50 μm, or more preferably approximately 5 μm to 20 μm. Due to setting this film thickness, it is possible to ensure sufficient intermediate layer performance while also achieving cost reduction by reducing the used amount of expensive intermediate layer material.

The material forming the intermediate layer can be a cerium oxide-based material, a zirconia-based material, or the like. Introducing the intermediate layer between the electrode layer A and the electrolyte layer B makes it possible to improve the performance, reliability, and durability of the electrochemical reaction portions R. Note that the intermediate layer is preferably formed using low-temperature heating (e.g., not performing heating treatment at a high temperature such as 1400° C., but rather performing a wet process using heating treatment at a low temperature of approximately 1100° C. or lower for example), a PVD technique such as sputtering or pulse laser deposition, a CVD technique, a spray coating technique, or the like. Due to these processes that can be used in a low temperature range, a favorable intermediate layer is obtained by performing treatment in a low temperature range of approximately 1100° C. or lower for example, without using heating in a high temperature range of 1400° C. or the like. This is preferable due to being able to suppress damage to the metal substrate 1 caused by high-temperature heating, suppress element interdiffusion between the metal substrate 1 and the electrode layer A caused by high-temperature heating, and realize an electrochemical element Q that has excellent durability.

Also, an intermediate layer may be formed as a film between the electrolyte layer B and the counter electrode layer C. The film thickness can be set to, for example, approximately 1 μm to 100 μm, preferably approximately 2 μm to 50 μm, or more preferably approximately 5 μm to 20 μm. Due to setting this film thickness, it is possible to ensure sufficient intermediate layer performance while also achieving cost reduction by reducing the used amount of expensive intermediate layer material.

The material forming the intermediate layer can be a cerium oxide-based material, a zirconia-based material, or the like. Introducing the intermediate layer between the electrolyte layer B and the counter electrode layer C effectively suppresses reactions between the material constituting the counter electrode layer C and the material constituting the electrolyte layer B, and makes it possible to improve long-term stability in the performance of the electrochemical reaction portions R. Note that the intermediate layer is preferably formed using low-temperature heating (e.g., not performing heating treatment at a high temperature such as 1400° C., but rather performing a wet process using heating treatment at a low temperature of approximately 1100° C. or lower for example), a PVD technique such as sputtering or pulse laser deposition, a CVD technique, a spray coating technique, or the like. Due to these processes that can be used in a low temperature range, a favorable intermediate layer is obtained by performing treatment in a low temperature range of approximately 1100° C. or lower for example, without using heating in a high temperature range of 1400° C. or the like. This is preferable due to being able to suppress damage to the metal substrate 1 caused by high-temperature heating, suppress element interdiffusion between the metal substrate 1 and the electrode layer A caused by high-temperature heating, and realize an electrochemical element Q that has excellent durability.

Either one of or both of the intermediate layers described above can be provided. In other words, it is possible to use a configuration in which the electrode layer A, the electrolyte layer B, an intermediate layer, and the counter electrode layer C are stacked in this order. It is also possible to use a configuration in which the electrode layer A, an intermediate layer, the electrolyte layer B, and the counter electrode layer C are stacked in this order. It is also possible to use a configuration in which the electrode layer A, an intermediate layer, the electrolyte layer B, an intermediate layer, and the counter electrode layer C are stacked in this order.

Electrochemical reaction in electrochemical reaction portions R

The electrochemical reaction portions R having the above configuration receive a supply of a gas and cause an electrochemical reaction to occur.

In the case of operating the electrochemical reaction portions R as a fuel cell, if an oxide ion electrical conductor is used as the electrolyte, a fuel containing hydrogen gas for example is supplied to the electrode layer A, and a gas containing oxygen is supplied to the counter electrode layer C. Accordingly, the oxygen molecules $O_2$ in the counter electrode layer C react with electrons $e^-$, thus producing oxygen ions (oxide ions) $O^{2-}$. The oxygen ions $O^{2-}$ move through the electrolyte layer B to the electrode layer A. In the electrode layer A, hydrogen molecules $H_2$ react with the oxygen ions $O^{2-}$, thus producing water $H_2O$ and electrons $e^-$. If a hydrogen ion electrical conductor is used as the electrolyte, hydrogen molecules $H_2$ in the electrode layer A release electrons $e^-$, thus producing protons (hydrogen ions) H. The hydrogen ions $H^+$ move through the electrolyte layer B to the counter electrode layer C. In the counter electrode layer C, the oxygen molecules $O_2$ react with the hydrogen ions $H^+$, thus using up the electrons $e^-$ and producing water $H_2O$.

Due to the above reaction, electromotive force is generated between the electrode layer A and the counter electrode layer C, thus generating power.

In the case of operating the electrochemical reaction portions R as an electrolysis cell, if an oxide ion electrical conductor is used as the electrolyte, when a voltage is applied between the electrode layer A and the counter electrode layer C, water molecules $H_2O$ in the electrode layer A receive electrons $e^-$, thus producing hydrogen molecules $H_2$ and oxygen ions (oxide ions) $O^{2-}$. The oxygen ions $O^{2-}$ move through the electrolyte layer B to the counter electrode layer C. In the counter electrode layer C, the oxygen ions $O^{2-}$ release electrons, thus becoming oxygen molecules $O_2$. If a hydrogen ion electrical conductor is used as the electrolyte, in the counter electrode layer C, oxygen molecules $O_2$ and hydrogen ions $H^+$ are produced from water $H_2O$, and electrons $e^-$ are released. The hydrogen ions $H^+$ move through the electrolyte layer B to the electrode layer A, and the hydrogen ions $H^+$ react with electrons $e^-$ in the electrode layer A, thus producing hydrogen molecules $H_2$.

Due to the above reaction, water molecules $H_2O$ are electrically decomposed into hydrogen $H_2$ and oxygen $O_2$.

Electrical Connections in Electrochemical Reaction Portions

In the following description, the electrode layer A, the electrolyte layer B, and the counter electrode layer C in the first electrochemical reaction portion R1 are referred to as a first electrode layer A1, a first electrolyte layer B1, and a first counter electrode layer C1. In the following description, the electrode layer A, the electrolyte layer B, and the counter electrode layer C in the second electrochemical reaction portion R2 are referred to as a second electrode layer A2, a second electrolyte layer B2, and a second counter electrode layer C2. The same follows for the third electrochemical reaction portions R and so on.

In the present embodiment, multiple electrochemical reaction portions R are electrically connected in series. Also, the electrode layer A of one electrochemical reaction portions R is electrically connected to the counter electrode layer C of another electrochemical reaction portion R.

The following describes the connection between the first electrochemical reaction portion R1 and the second electrochemical reaction portion R2 with reference to the cross-sectional view in the middle section in FIG. 1. In the first layer and the second layer, an insulating layer D and a conductive layer E are formed between the first electrochemical reaction portion R1 and the second electrochemical reaction portion R2. The serial connection between the first electrochemical reaction portion R1 and the second electrochemical reaction portion R2 is realized by the insulating layer D and the conductive layer E.

The insulating layer D can be formed using an insulating metal oxide such as alumina. In the present embodiment, the insulating layer D is formed dense, and has a gas-tight configuration for suppressing gas permeability.

The conductive layer E is also called an interconnector, and can be formed using a metal oxide that has an electrical conducting characteristic, such as $LaCrO_3$ (lanthanum chromite) or $SrTiO_3$ (strontium titanate). In the present embodiment, the conductive layer E is formed dense, and has a gas-tight configuration for suppressing gas permeability.

In the first layer, an insulating layer D is formed between the first electrode layer A1 and the second electrode layer A2. In the second layer, an insulating layer D and a conductive layer E are formed between the first electrolyte layer B1 and the second electrolyte layer B2. The insulating layer D in the second layer is formed spanning both the insulating layer and the first electrode layer A1 in the first layer. The conductive layer E is formed spanning both the insulating layer and the second electrode layer A2 in the first layer. In the third layer, the first counter electrode layer C1 is formed extending from above the first electrolyte layer B1, beyond the insulating layer D in the second layer, to the conductive layer E. In other words, the conductive layer E in the second layer is in contact with and electrically connected to both the first counter electrode layer C1 and the second electrode layer A2.

According to the above configuration, the first electrode layer A1 and the second electrode layer A2 are insulated from each other by the presence of the insulating layer D. Also, the first counter electrode layer C1 and the second electrode layer A2 are electrically connected to each other by the presence of the conductive layer E.

In the case where the electrochemical reaction portions R operates as a fuel cell, electromotive force is generated between the electrode layer A and the counter electrode layer C as described above. Accordingly, due to the first counter electrode layer C1 and the second electrode layer A2 being electrically connected, the electromotive force that is generated between the first electrode layer A1 and the second counter electrode layer C2, this electromotive force is a combination of the electromotive force generated by the first electrochemical reaction portion R1 and the electromotive force generated by the second electrochemical reaction portion R2. In other words, in this case, the first electrochemical reaction portion R1 and the second electrochemical reaction portion R2 are electrically connected in series.

As shown in the cross-sectional view in the middle section in FIG. 1, the second counter electrode layer C2 and the third electrode layer A3 are also connected to each other by the conductive layer E. The third counter electrode layer C3 and the fourth electrode layer A4 are also connected to each other by the conductive layer E. The fourth counter electrode layer C4 and the fifth electrode layer A5 are also connected to each other by the conductive layer E. In other words, the second to fifth electrochemical reaction portions R2 to R5 are also similarly electrically connected to each other in series.

Configurations for electrically connecting the electrochemical element Q to the outside are arranged at the two ends of the electrochemical reaction portions R that are electrically connected in series. In the present embodiment, a collector member 26 is connected to the fifth counter electrode layer C5 of the fifth electrochemical reaction portion R5. Also, the conductive layer E is connected to the first electrode layer A1 of the first electrochemical reaction portion R1, and a collector member 26 is connected above the conductive layer E.

A member that has electrical conductivity and gas permeability is used as the collector members 26. For example, it is possible to use an expand metal, metal mesh, or felt-like member that employs a metal foil provided with an oxidation resistant coating.

In the case where the electrochemical element Q having the above configuration is operated as a fuel cell, electromotive force is generated between the collector members 26 at the two ends. If the collector members 26 are connected to an external load or the like, as shown in the cross-sectional view in the middle section in FIG. 1, current flows from the collector member 26 on the first electrochemical reaction portion R1 side toward the collector member 26 of the fifth electrochemical reaction portion R5, as shown by an arrow I. In other words, the five series-connected fuel cells (electrochemical reaction portions R) supply power to the outside.

Note that in the case where the electrochemical element Q of the present embodiment is operated as an electrolysis cell as described above, a voltage is applied between the pair of collector members 26. Accordingly, due to the electrode layers A and the counter electrode layers C of the electrochemical reaction portions R being connected as described above, the voltage is applied to the electrochemical reaction portions R, and the electrolytic reaction progresses. In other words, in this case as well, it can be deemed that five electrolysis cells operate in series-connection, and it can be said that the electrochemical reaction portions R are electrically connected in series.

Sealing of Gas in Electrochemical Element

With the electrochemical element Q, the gas flowing through the gas flow allowing regions P of the metal substrate 1 is supplied to the electrode layer A, and it is necessary to suppress the leakage of the gas to the counter electrode layer C. To achieve this, the electrochemical element Q of the present embodiment has the following structure in order to seal in the gas.

In the present embodiment, the first electrode layer A1 is formed so as to cover the first gas flow allowing region P1. The other second to fifth electrode layers A2 to A5 are also similarly formed so as to cover the second to fifth gas flow allowing regions P2 to P5 respectively. In other words, the electrode layer A is provided so as to cover the gas flow allowing regions P over a region larger than the gas flow allowing regions P. In this case, if the electrode layer A is covered with a gas-tight layer, it is possible to suppress the leakage of gas.

The following description focuses on the third electrochemical reaction portion R3. The third electrode layer A3 is covered by the third electrolyte layer B3, the insulating layer D, and the conductive layer E. The third electrolyte layer B3 is arranged so as to cover at least the third electrode layer A3 provided in the third gas flow allowing region P3.

Specifically, the third electrolyte layer B3 is formed so as to have a wider width than the third electrode layer A3 in the widthwise direction. In the region where the third electrode layer A3 is present, the third electrode layer A3 is arranged over the third electrode layer A3, that is to say on the second layer. In the region where the third electrode layer A3 is not present (the regions on the two sides of the third electrode layer A3 in the widthwise direction), the third electrolyte layer B3 is arranged over the metal substrate 1, that is to say on the first layer. The third electrolyte layer B3 of the first layer and the third electrolyte layer B3 of the second layer are formed as layers that are continuous with each other, thus suppressing the leakage of gas from the connection regions therebetween.

The two ends of the third electrode layer A3 in the lengthwise direction are covered by the insulating layer D and the conductive layer E. The insulating layer D and the conductive layer E of the second layer extend in a narrow manner in the widthwise direction, and in the region where the third electrode layer A3 is not present (the regions on the two sides of the third electrode layer A3 in the widthwise direction), the insulating layer D and the conductive layer E of the second layer are respectively connected to the insulating layer D and the conductive layer E of the first layer. The insulating layer D of the first layer and the insulating layer D of the second layer are formed as layers that are continuous with each other, and the same follows for the conductive layer E of the first layer and the conductive layer E of the second layer, thus suppressing the leakage of gas from the connection regions between them.

As described above, the third electrode layer A3 is covered by the third electrolyte layer B3, the insulating layer D, and the conductive layer E. The electrolyte layer B, the insulating layer D, and the conductive layer E are each a gas-tight layer that has low gas permeability, and therefore according to the above configuration, it is possible to suppress the case where the gas supplied to the third electrode layer A3 leaks to the counter electrode layer C.

Although the above description focuses on the third electrochemical reaction portion R3, the same applies to the second electrochemical reaction portion R2, the fourth electrochemical reaction portion R4, and the fifth electrochemical reaction portion R5 as well. Also, one end of the first electrochemical reaction portion R1 in the lengthwise direction is covered by only the conductive layer E, but the leakage of gas is similarly suppressed.

The electrochemical reaction portions R of the present embodiment having the above-described structure can be formed as follows. First, the electrode layer A, the insulating layer D, and the conductive layer E of the first layer are formed on the metal substrate 1 with the planar shapes shown in the top view in the lower section in FIG. 1. Next, the electrolyte layer B, the insulating layer D, and the conductive layer E of the second layer are formed on the metal substrate 1 and the first layer with the planar shapes shown in the top view in the lower section in FIG. 1, that is to say with a larger width than the first layer in the widthwise direction. Accordingly, the electrode layer A is covered by the electrolyte layer B, the insulating layer D, and the conductive layer E. The counter electrode layer C of the third layer is then formed on the second layer.

Second Embodiment

Figure 2:
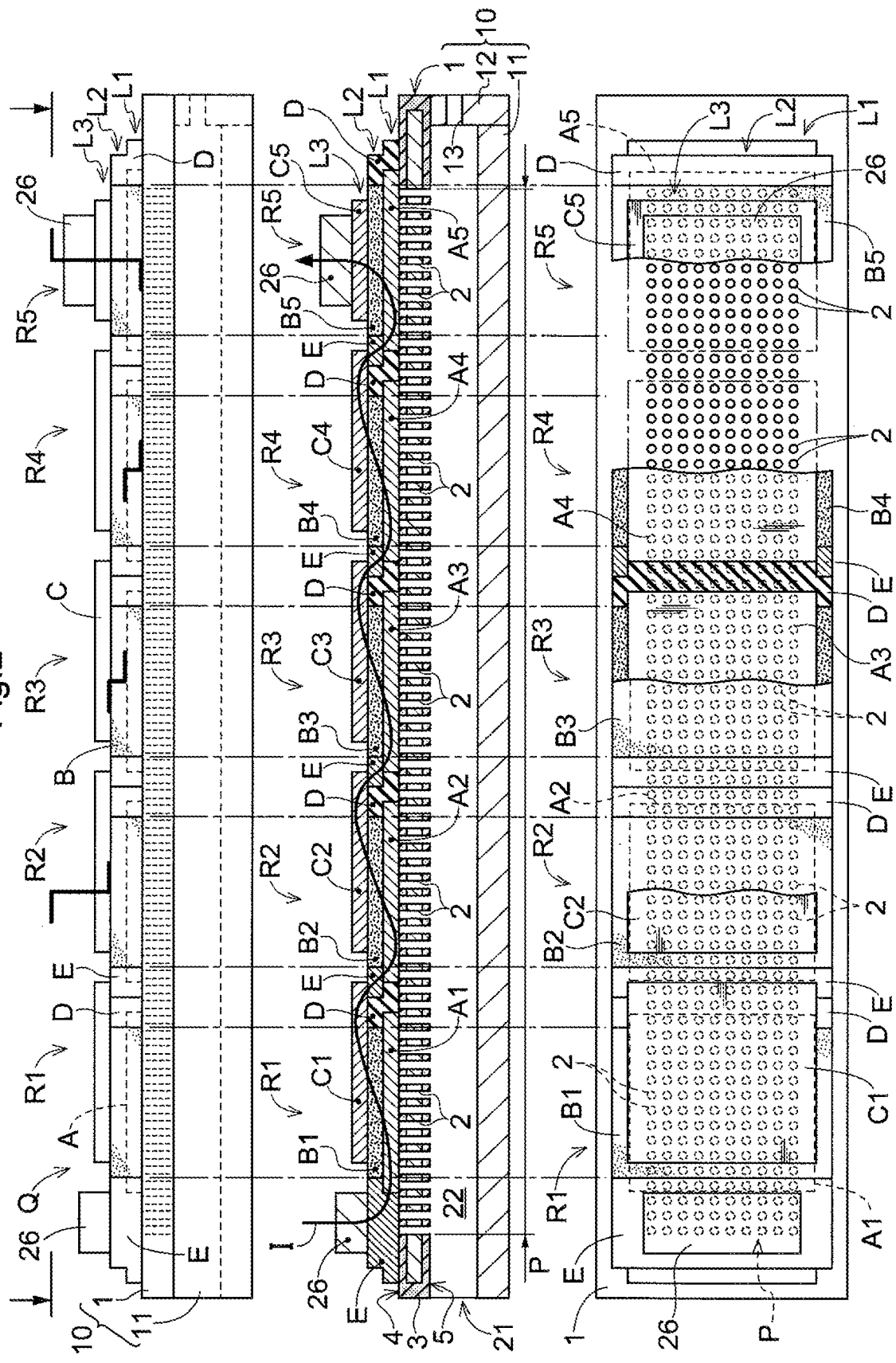
FIG. 2 is a front view and a cross-sectional view of a structure of the electrochemical element, and a top view of the multi-layer structure.

An electrochemical element Q according to a second embodiment is shown in FIG. 2. Note that in the following second to tenth embodiments and other embodiments, configurations similar to those of the first embodiment are denoted by the same reference signs, and descriptions may not be given for them.

In this electrochemical element Q, the through holes 2 are formed so as to be continuous along the lengthwise direction of the metal substrate 1. In other words, the gas flow allowing regions P are formed as to be a single continuous region. Also, in the present embodiment as well, the electrode layer A provided in the gas flow allowing region P is covered by the electrolyte layer B, the insulating layer D, and the conductive layer E. Accordingly, this suppresses the case where the gas supplied to the electrode layer A leaks to the counter electrode layer C.

Third Embodiment

Figure 3:
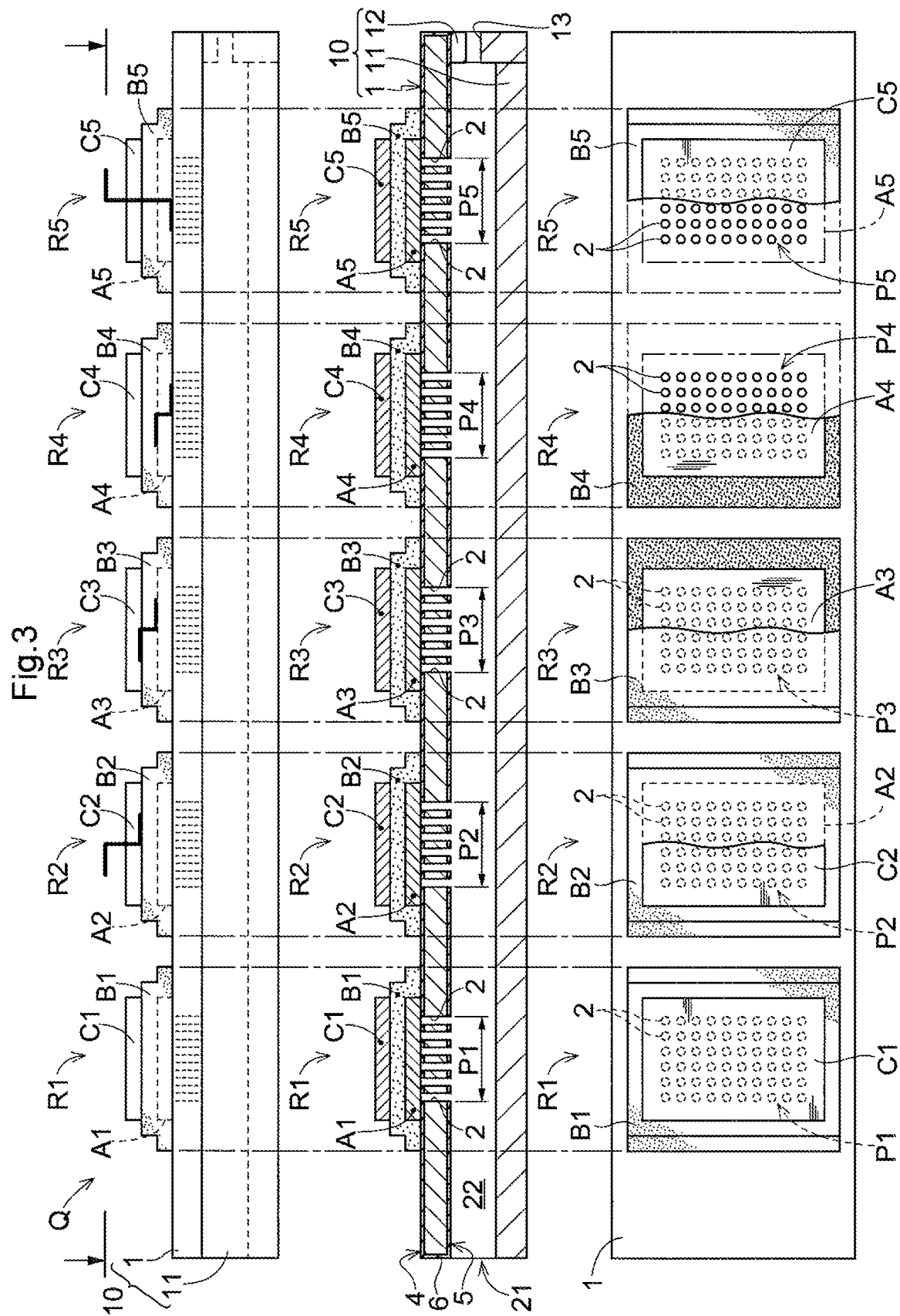
FIG. 3 is a front view and a cross-sectional view of a structure of the electrochemical element, and a top view of the multi-layer structure.

An electrochemical element Q according to a third embodiment is shown in FIG. 3. In the present embodiment, the electrode layer A of one electrochemical reaction portion R and the electrode layer A of another electrochemical reaction portion R are electrically connected, and thus multiple electrochemical reaction portions R are electrically connected in parallel.

At least a portion of the upper surface of the metal substrate 1 that is in contact with the electrode layer A is provided with a diffusion preventing film 6 (metal oxide film) instead of an insulating film. The diffusion preventing film 6 is provided in order to suppress the dispersion of Cr from the metal substrate 1. Unlike the insulating film, the diffusion preventing film 6 has electrical conductivity, and is configured with a low resistance value so as to not suppress the conduction of electricity between the electrode layer A of the electrochemical reaction portion R and the metal substrate 1.

Note that it is sufficient that the metal oxide film that covers the region of the upper surface of the metal substrate 1 that is covered by neither the electrode layer nor the electrolyte layer/counter electrode layer has a function of suppressing the vaporization of a component such as Cr oxide from the metal substrate 1, and it may be an insulating film or a diffusion preventing film that has electrical conductivity.

The resistance value of the diffusion preventing film 6 need only be approximately $0.1\Omega \cdot cm^2$ or lower, and is favorably approximately $0.05\Omega \cdot cm^2$ or lower due to being able to ensure sufficient electromotive force and electrical current amount even if the electrochemical element Q is operated as a fuel cell.

The material forming the metal substrate 1 is a metal material having excellent heat resistance, oxidation resistance, and corrosion resistance characteristics. Examples of the material include ferrite-based stainless steel, austenite-based stainless steel, and a nickel-based alloy. It is particularly favorable to use an alloy that contains chrome. For example, in the case of using an Fe—Cr-based alloy material that contains Cr at approximately 15 wt % to 25 wt %, the coefficient of thermal expansion approaches that of the materials forming the electrode layer A and the electrolyte layer B provided thereon, and this is preferable due to being able to obtain an electrochemical element that has excellent reliability and durability. It is also possible to use a Cr-rich Cr—Fe-based alloy that contains Cr at 70 wt % or more. It is further possible to use an alloy that is Ni—Cr—Al based, Fe—Cr—Al based, or the like. The diffusion preventing film 6 can be formed using various techniques, but it is favorable to use a technique of oxidizing the upper surface of the metal substrate 1 to obtain a metal oxide. In this case, by subjecting the metal substrate 1 to heat treatment in an atmosphere having a low oxygen partial pressure, or an inert gas or hydrogen atmosphere, a diffusion preventing film 6 that has an appropriate thickness and resistance value can be favorably formed on the upper surface of the metal substrate 1. In particular, if the metal substrate 1 is formed using an Fe—Cr-based alloy material that contains Cr at approximately 15 wt % to 25 wt %, this is preferable because a diffusion preventing film that has chromium oxide as a main component can be easily formed on the upper surface of the metal substrate 1 by heating treatment. Also, the diffusion preventing film 6 may be formed on the upper surface of the metal substrate 1 by using, for example, a PVD technique such as sputtering or PLD, a CVD technique, or a spray coating technique, or may be formed by plating or oxidation treatment. Furthermore, the diffusion preventing film 6 may contain a spinel phase that has high electrical conductivity.

In the present embodiment, similarly to the first embodiment, five gas flow allowing regions P (first gas flow allowing region P1 to fifth gas flow allowing region P5) are formed with gaps therebetween on the metal substrate 1. The five electrochemical reaction portions R (first electrochemical reaction portion R1 to fifth electrochemical reaction portion R5) are formed with gaps therebetween.

Specifically, firstly, five electrode layers A (first electrode layer A1 to fifth electrode layer A5) are formed so as to respectively cover the gas flow allowing regions P in regions larger than the gas flow allowing regions P. The five electrode layers A are formed with gaps therebetween. Also, five electrolyte layers B (first electrolyte layer B1 to fifth electrolyte layer B5) are formed so as to respectively cover the electrode layers A in regions larger than the electrode layers A. The five electrolyte layers B are formed with gaps therebetween. Five counter electrode layers C (first counter electrode layer C1 to fifth counter electrode layer C5) are respectively formed on the electrolyte layers B.

The gas flow allowing regions P are each covered by an electrode layer A, and the electrode layers A are each covered by an electrolyte layer B, thus suppressing the case where the gas supplied from the gas flow allowing regions P to the electrode layers A leaks to the counter electrode layers C. In other words, in the present embodiment, the metal substrate 1 has multiple gas flow allowing regions P that are separated from each other, and the electrolyte layers B of the electrochemical reaction portions R are arranged so as to cover the electrode layers A provided in the respective gas flow allowing regions P.

As described above, in the present embodiment, the diffusion preventing film 6 that has electrical conductivity is formed on the upper surface of the metal substrate 1. Accordingly, the electrode layers A, which are formed with gaps therebetween, are electrically connected via the metal substrate 1. In the first embodiment and the second embodiment, the electrode layer A and the counter electrode layer C of adjacent electrochemical reaction portions R are electrically connected, thus connecting the electrochemical reaction portions R in series. In the present embodiment, the electrode layers A of adjacent electrochemical reaction portions R are electrically connected, thus electrically connecting the electrochemical reaction portions R in parallel.

In the case of operating the electrochemical element Q of the present embodiment as a fuel cell, hydrogen flowing through the gas flow allowing regions P is supplied to the electrode layers A, oxygen is supplied to the counter electrode layers C, and electromotive force is generated between the electrode layers A and counter electrode layers C. The first to fifth electrode layers A1 to A5 are electrically connected by the metal substrate 1, and thus have the same potential. Also, collector members (not shown) attached to the first to fifth counter electrode layers C1 to C5, and the metal substrate 1 (or the tubular gas flowing portion 10) are connected to the outside, thus extracting electromotive force/electrical current to the outside. In other words, the five parallel-connected fuel cells (electrochemical reaction portions R) supply power to the outside.

In the case where the electrochemical element Q of the present embodiment is operated as an electrolysis cell, water (water vapor) flowing through the gas flow allowing regions P is supplied to the electrode layers A, and a voltage is applied between the metal substrate 1 (or the tubular gas flowing portion 10) and the collector members (not shown) attached to the first to fifth counter electrode layers C1 to C5. Accordingly, the first to fifth electrode layers A1 to A5 are electrically connected by the metal substrate 1, and therefore the voltage is applied to the electrochemical reaction portions R, and the electrolytic reaction progresses. In other words, in this case as well, it can be deemed that five electrolysis cells operate in parallel-connection, and it can be said that the electrochemical reaction portions R are electrically connected in parallel.

Fourth Embodiment

Figure 4:
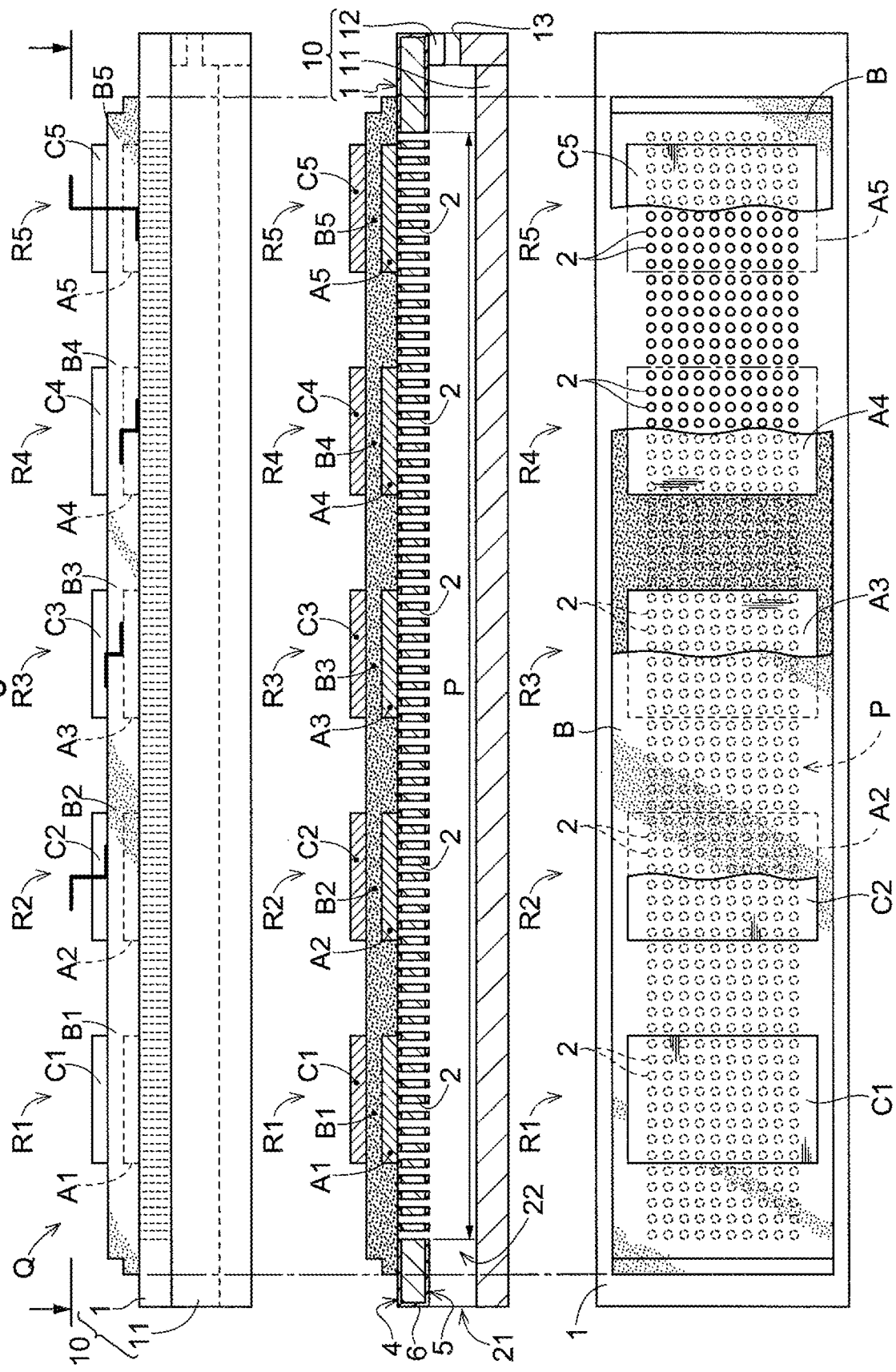
FIG. 4 is a front view and a cross-sectional view of a structure of the electrochemical element, and a top view of the multi-layer structure.

An electrochemical element Q according to a fourth embodiment is shown in FIG. 4. In this electrochemical element Q, similarly to the second embodiment, the through holes 2 are formed so as to be continuous along the lengthwise direction of the metal substrate 1. In other words, the gas flow allowing regions P are formed as to be a single continuous region. The diffusion preventing film 6 is formed on the upper surface of the metal substrate 1.

Five electrode layers A (first electrode layer A1 to fifth electrode layer A5) are formed on the upper side 4 of the metal substrate 1. The five electrode layers A are formed with gaps therebetween. The electrolyte layer B is formed thereon so as to cover the gas flow allowing region P, in a region larger than the gas flow allowing region P. In the present embodiment, the electrolyte layer B is formed as a single continuous layer, and is formed so as to span the first layer and the second layer over substantially the entirety of the upper side 4 of the metal substrate 1. The five electrode layers A are covered by the electrolyte layer B. Accordingly, this suppresses the case where the gas supplied to the electrode layers A leaks to the counter electrode layers C. Five counter electrode layers C (first counter electrode layer C1 to fifth counter electrode layer C5) are respectively formed over the electrolyte layer B, in regions corresponding to the electrode layers A.

Because the five electrode layers A and the five counter electrode layers C are formed with gaps therebetween, an electrochemical reaction can occur between the opposing electrode layers A and counter electrode layers C and the electrolyte layer B sandwiched therebetween. In other words, the first electrochemical reaction portion R1 is formed by the first electrode layer A1, the first counter electrode layer C1, and the first electrolyte layer B1 that is the portion sandwiched therebetween. Similarly, the second to fifth electrochemical reaction portions R2 to R5 are formed by the second to fifth electrode layers A2 to A5, the second to fifth counter electrode layers C2 to C5, and the second to fifth electrolyte layers B2 to B5 that are the portions sandwiched therebetween. In other words, in the present embodiment, multiple electrochemical reaction portions R are arranged on the upper side 4 of the metal substrate 1.

Similarly to the third embodiment, the electrode layers A, which are formed with gaps therebetween, are electrically connected via the metal substrate 1. Accordingly, it can be said that the electrochemical reaction portions R are electrically connected in parallel.

Fifth Embodiment

In the above embodiments, multiple electrochemical reaction portions R are provided in a single row that extends along the lengthwise direction of the rectangular metal substrate 1. It is possible to modify this configuration and form the electrochemical reaction portions R side-by-side in multiple rows.

Figure 5:
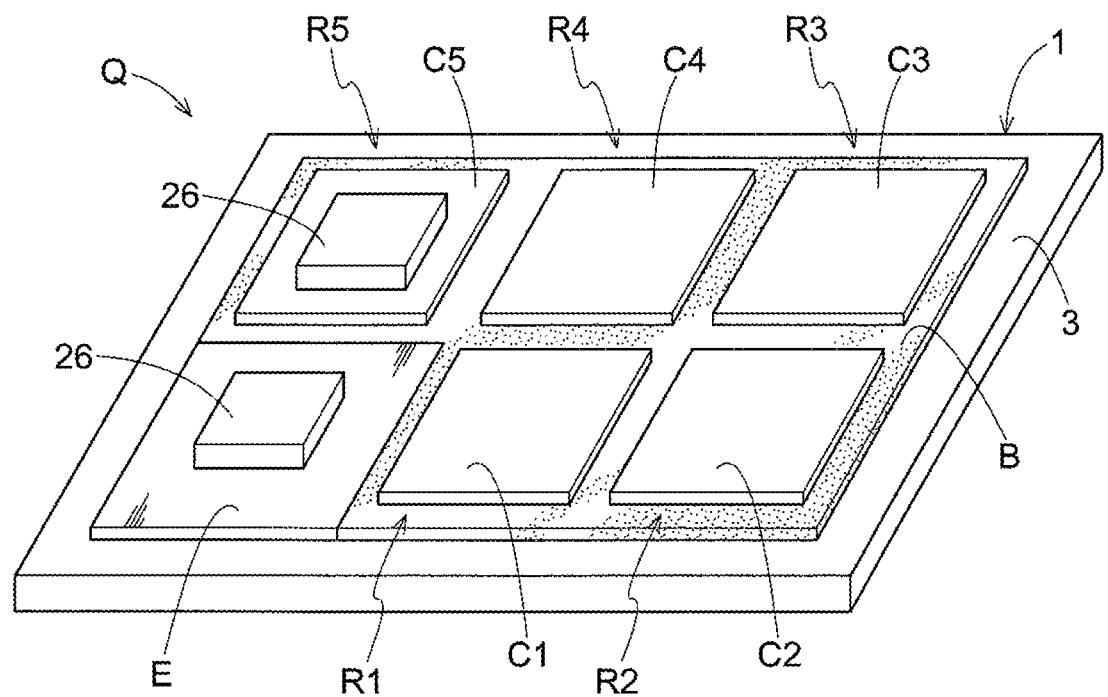
FIG. 5 is a perspective view of a structure of the electrochemical element.

An electrochemical element Q according to a fifth embodiment is shown in FIG. 5. In the example described in the present embodiment, five electrochemical reaction portions R are arranged in two rows on the metal substrate 1. Specifically, in the front row in FIG. 5, a collector member 26, a conductive layer E, the first electrochemical reaction portion R1, and the second electrochemical reaction portion R2 are arranged in this order, and in the rear row in FIG. 5, the fifth electrochemical reaction portion R5, the fourth electrochemical reaction portion R4, and the third electrochemical reaction portion R3 are arranged in this order.

An insulating film 3 (metal oxide film) is formed on/over the upper surface of the metal substrate 1. Although not shown, multiple through holes 2 that penetrate the upper side 4 and the lower side 5 are formed in the metal substrate 1, and five gas flow allowing regions P, which are regions of groups of through holes 2, are formed at positions corresponding to the five electrochemical reaction portions R. Note that similarly to the second embodiment, it is also possible to form a single gas flow allowing region P over the entirety of the metal substrate 1. It should be noted that in this case, it is necessary to form the gas flow allowing region P so as to fit inside the region where the conductive layer E and the electrolyte layer B are formed, so as to suppress the leakage of gas from the lower side 5 of the metal substrate 1 to the counter electrode layers C (upper side 4 of the metal substrate 1).

Note that although the metal substrate 1 and the electrochemical reaction portions R are shown in FIG. 5, similarly to the first embodiment, it is also possible to attach the U-shaped member 11 and the cover portion 12 to the metal substrate 1 to form the tubular gas flowing portion 10.

In the present embodiment, similarly to the first embodiment and the second embodiment, the first to fifth electrochemical reaction portions R1 to R5 are electrically connected in series and connected to a pair of collector members 26. In other words, the electrode layer A of one electrochemical reaction portions R is electrically connected to the counter electrode layer C of another electrochemical reaction portion R. The structure of each electrochemical reaction portion R, that is to say the arrangement and positional relationship of the electrode layer A, the electrolyte layer B, the counter electrode layer C, the insulating layer D, and the conductive layer E, is similar to that in the first embodiment.

Sixth Embodiment

Figure 6:
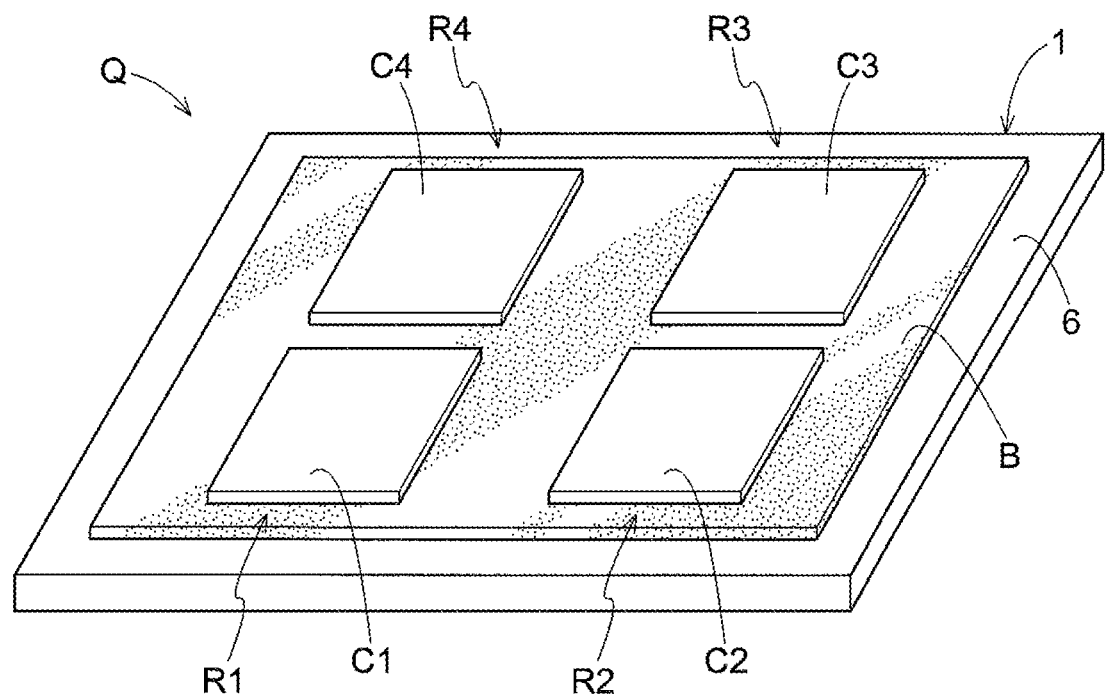
FIG. 6 is a perspective view of a structure of the electrochemical element.

An electrochemical element Q according to a sixth embodiment is shown in FIG. 6. In the example described in the present embodiment, four electrochemical reaction portions R are arranged in two rows on the metal substrate 1. Specifically, in the front row in FIG. 6, the first electrochemical reaction portion R1 and the second electrochemical reaction portion R2 are arranged in this order, and in the rear row in FIG. 6, the fourth electrochemical reaction portion R4 and the third electrochemical reaction portion R3 are arranged in this order.

A diffusion preventing film 6 (metal oxide film) is formed on/over the upper surface of the metal substrate 1. Although not shown, multiple through holes 2 that penetrate the upper side 4 and the lower side 5 are formed in the metal substrate 1, and four gas flow allowing regions P, which are regions of groups of through holes 2, are formed at positions corresponding to the four electrochemical reaction portions R. Note that similarly to the fourth embodiment, it is also possible to form a single gas flow allowing region P over the entirety of the metal substrate 1. It should be noted that in this case, it is necessary to form the gas flow allowing region P so as to fit inside the region where the conductive layer E and the electrolyte layer B are formed, so as to suppress the leakage of gas from the lower side 5 of the metal substrate 1 to the counter electrode layers C (upper side 4 of the metal substrate 1).

In the present embodiment, similarly to the third embodiment and the fourth embodiment, the first to fourth electrochemical reaction portions R1 to R4 are electrically connected in parallel. In other words, the electrode layer A of one electrochemical reaction portions R is electrically connected to the electrode layer A of another electrochemical reaction portion R. The structure of each electrochemical reaction portion R, that is to say the arrangement and positional relationship of the electrode layer A, the electrolyte layer B, and the counter electrode layer C, is similar to that in the fourth embodiment.

Note that although the metal substrate 1 and the electrochemical reaction portions R are shown in FIG. 6, similarly to the first embodiment, it is also possible to attach the U-shaped member 11 and the cover portion 12 to the metal substrate 1 to form the tubular gas flowing portion 10.

Seventh Embodiment

Figure 7:
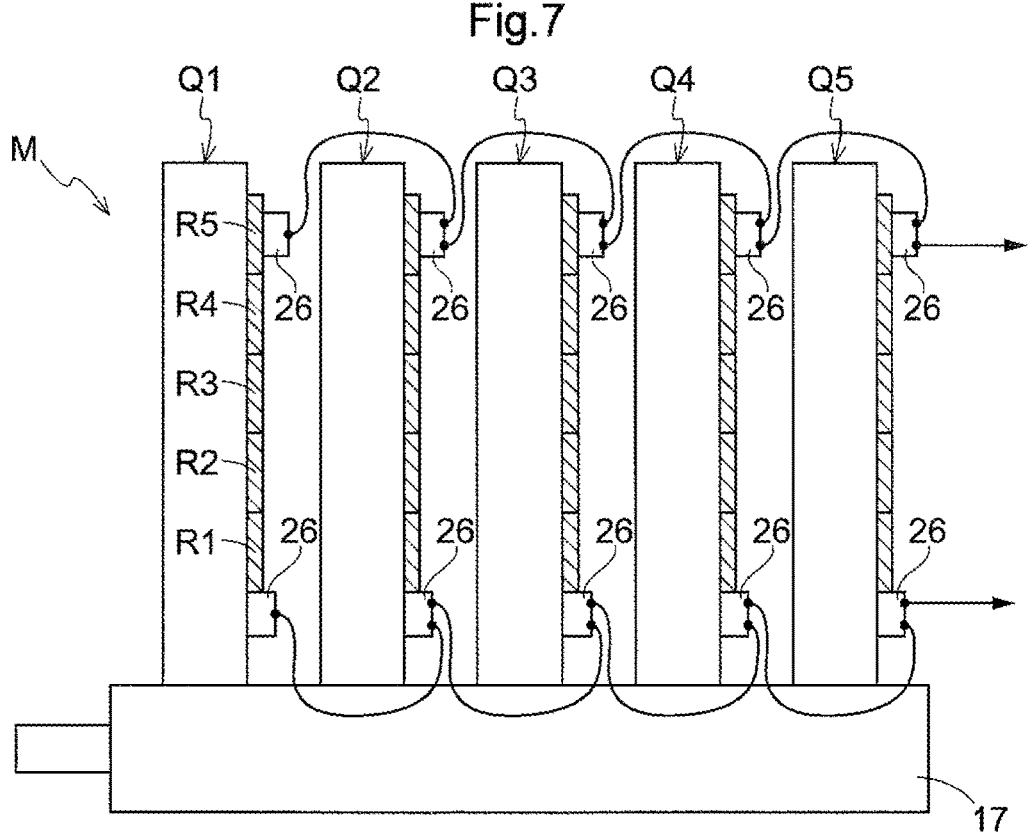
FIG. 7 is a schematic view of a structure of an electrochemical module.

FIG. 7 shows the configuration of an electrochemical module M. The electrochemical module M is a module obtained by arranging any of the above-described electrochemical elements Q in a stacked state. The electrochemical module M of a seventh embodiment uses the electrochemical element Q in which multiple electrochemical reaction portions R are electrically connected in series, that is to say the electrochemical element Q according to the first embodiment, the second embodiment, or the fifth embodiment.

The electrochemical module M has a gas manifold 17 and five electrochemical elements Q. The electrochemical elements Q are connected to the gas manifold 17 such that the gas inlets 21 of the tubular gas flowing portions 10 of the electrochemical elements Q are in communication with the internal space of the gas manifold 17. In the present embodiment, the five electrochemical elements Q are stacked in an orientation which the electrochemical reaction portions R face one direction (the right side in FIG. 7), and attached to the gas manifold 17 in this state.

Although the electrochemical element Q in which multiple electrochemical reaction portions R are electrically connected in series is used in the present embodiment, the electrochemical reaction portions R are insulated from the metal substrate 1, that is to say from the tubular gas flowing portion 10. Accordingly, there is no need to perform insulation when attaching the tubular gas flowing portion 10 to the gas manifold 17, and this attachment can be performed by an easy and sturdy method such as welding.

The electrochemical elements Q of the electrochemical module M are electrically connected to each other. In the present embodiment, the collector members 26 connected to the first electrochemical reaction portions R1 of the electrochemical elements Q are electrically connected to each other, and connected to the outside. Also, the collector members 26 connected to the fifth electrochemical reaction portions R5 of the electrochemical elements Q are electrically connected to each other, and connected to the outside. According to the above connections, five sets of electrochemical reaction portions R, each including five series-connected electrochemical reaction portions, are connected in parallel.

In the case of operating the electrochemical module M as a fuel cell, hydrogen is supplied to the interior of the gas manifold 17, and oxygen is supplied to the region surrounding of the electrochemical elements Q. Accordingly, a fuel cell reaction progresses in the electrochemical reaction portions R, and electromotive force and electrical current are generated. The generated electrical power is extracted from the collector members 26 to the outside of the electrochemical module M.

Eighth Embodiment

Figure 8:
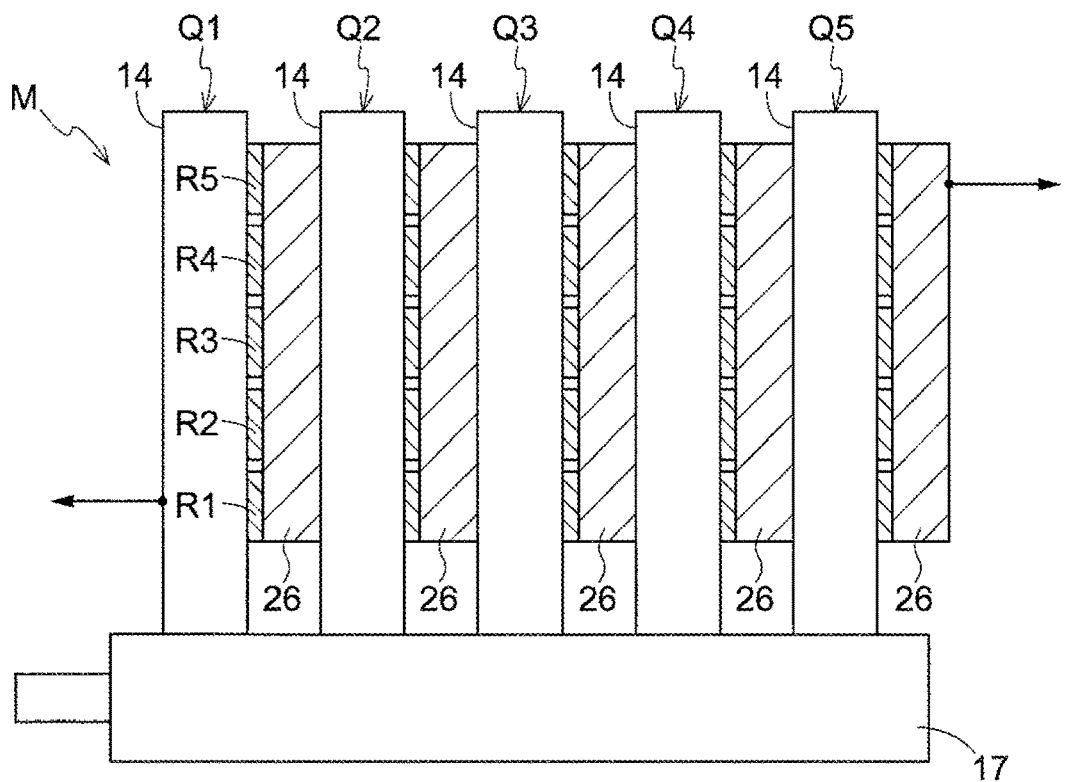
FIG. 8 is a schematic view of a structure of the electrochemical module.

FIG. 8 shows another embodiment of the electrochemical module M. The electrochemical module M of an eighth embodiment uses the electrochemical element Q in which multiple electrochemical reaction portions R are electrically connected in parallel, that is to say the electrochemical element Q according to the third embodiment, the fourth embodiment, or the sixth embodiment.

Similarly to the seventh embodiment, the electrochemical elements Q are connected to the gas manifold 17 such that the gas inlets 21 of the tubular gas flowing portions 10 of the electrochemical elements Q are in communication with the internal space of the gas manifold 17. In the present embodiment, the five electrochemical elements Q are stacked in an orientation which the electrochemical reaction portions R face one direction (the right side in FIG. 8), and attached to the gas manifold 17 in this state. Also, the collector members 26 are arranged between adjacent electrochemical elements Q and electrically connect the electrochemical reaction portions R to back surfaces 14 of the tubular gas flowing portions 10 of the electrochemical elements Q. Accordingly, five sets of electrochemical reaction portions R, each including five parallel-connected electrochemical reaction portions, are connected in series.

In the case of operating the electrochemical module M as a fuel cell, hydrogen is supplied to the interior of the gas manifold 17, and oxygen is supplied to the region surrounding of the electrochemical elements Q. Accordingly, a fuel cell reaction progresses in the electrochemical reaction portions R, and electromotive force and electrical current are generated. The generated electrical power is extracted from both ends of the stack of electrochemical elements Q. In other words, the generated electrical power is extracted to the outside of the electrochemical module M from the back surface 14 of the tubular gas flowing portion 10 of the first electrochemical reaction portion R1 and from the collector member 26 of the fifth electrochemical reaction portion R5.

Note that although the electrochemical element Q in which multiple electrochemical reaction portions R are electrically connected in parallel is used in the present embodiment, the electrochemical reaction portions R are not insulated from the metal substrate 1, that is to say from the tubular gas flowing portion 10, but rather are in an electrically conductive state. Accordingly, when the tubular gas flowing portions 10 are attached to the gas manifold 17, it is necessary to insulate the tubular gas flowing portions 10 from the gas manifold 17. For example, the tubular gas flowing portions 10 and the gas manifold 17 are joined by a glass seal member.

Ninth Embodiment

Figure 9:
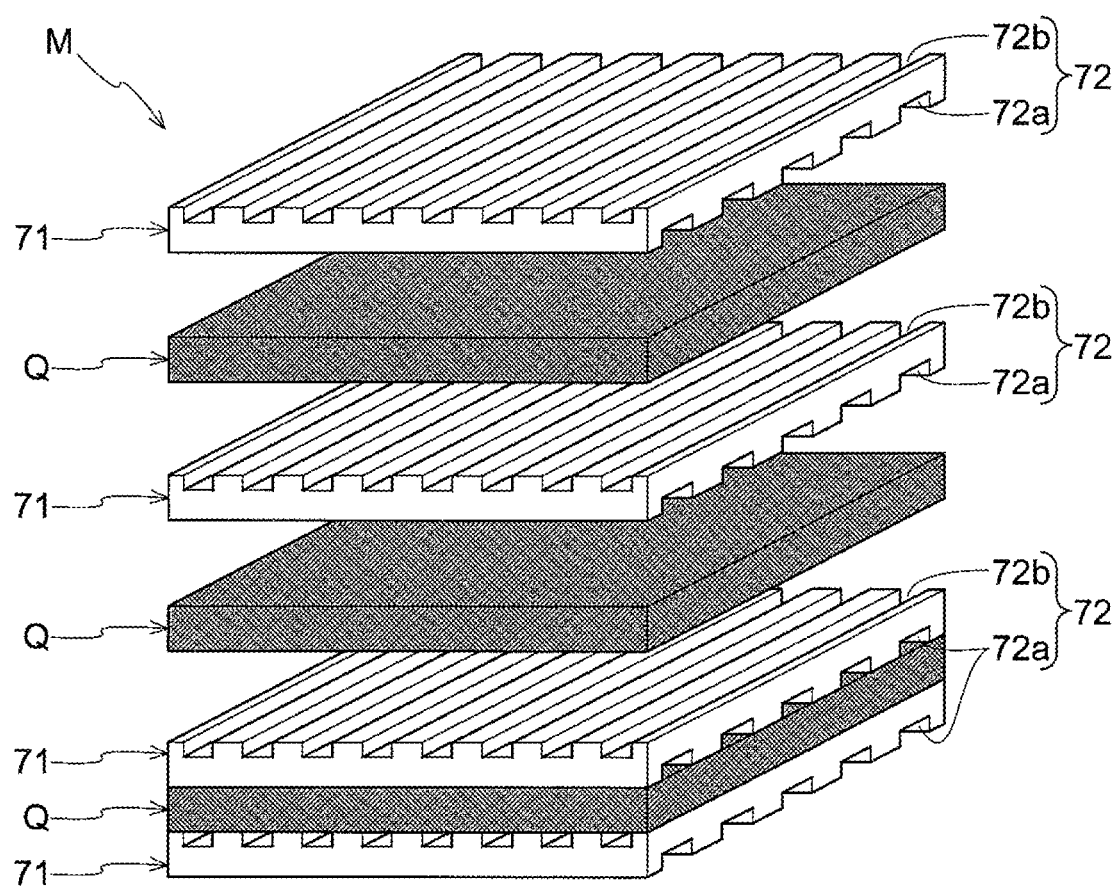
FIG. 9 is a schematic view of a structure of the electrochemical module.

FIG. 9 shows another embodiment of the electrochemical module M. In the electrochemical module M according to a ninth embodiment, it is possible to favorably use the electrochemical element Q according to the sixth embodiment shown in FIG. 6, that is to say the electrochemical element Q in which multiple electrochemical reaction portions R are electrically connected in parallel. The electrochemical module M is constituted by stacking these electrochemical elements Q with cell connecting members 71 sandwiched therebetween.

The cell connecting members 71 are each a plate-shaped member that has electrically conductivity and does not have gas permeability, and the upper surface and the lower surface are respectively provided with grooves 72 that are orthogonal to each other. The cell connecting members 71 can be formed using a metal such as stainless steel or a metal oxide.

As shown in FIG. 9, when the electrochemical elements Q are stacked with the cell connecting members 71 sandwiched therebetween, a gas can be supplied to the electrochemical elements Q through the grooves 72. Specifically, the grooves 72 on one side are first gas passages 72a and supply a gas to the upper side of one electrochemical element Q, that is to say the counter electrode layers C. The grooves 72 on the other side are second gas passages 72b and supply a gas to the lower side of one electrochemical element Q, that is to say the gas flow allowing regions P of the metal substrate 1.

In the case of operating this electrochemical module M as a fuel cell, oxygen is supplied to the first gas passages 72a, and hydrogen is supplied to the second gas passages 72b. Accordingly, a fuel cell reaction progresses in the electrochemical reaction portions R of the electrochemical elements Q, and electromotive force and electrical current are generated. The generated electrical power is extracted to the outside of the electrochemical module M from the cell connecting members 71 at the two ends of the stack of electrochemical elements Q.

Note that although the grooves 72 that are orthogonal to each other are respectively formed on the upper surface and the lower surface of each of the cell connecting members 71 in the ninth embodiment, grooves 72 that are parallel to each other can be respectively formed on the upper surface and the lower surface of each of the cell connecting members 71.

Tenth Embodiment

An electrochemical device Y and an energy system Z can be constructed using the electrochemical elements Q and the electrochemical module M described above.

Energy System, Electrochemical Device

Figure 10:
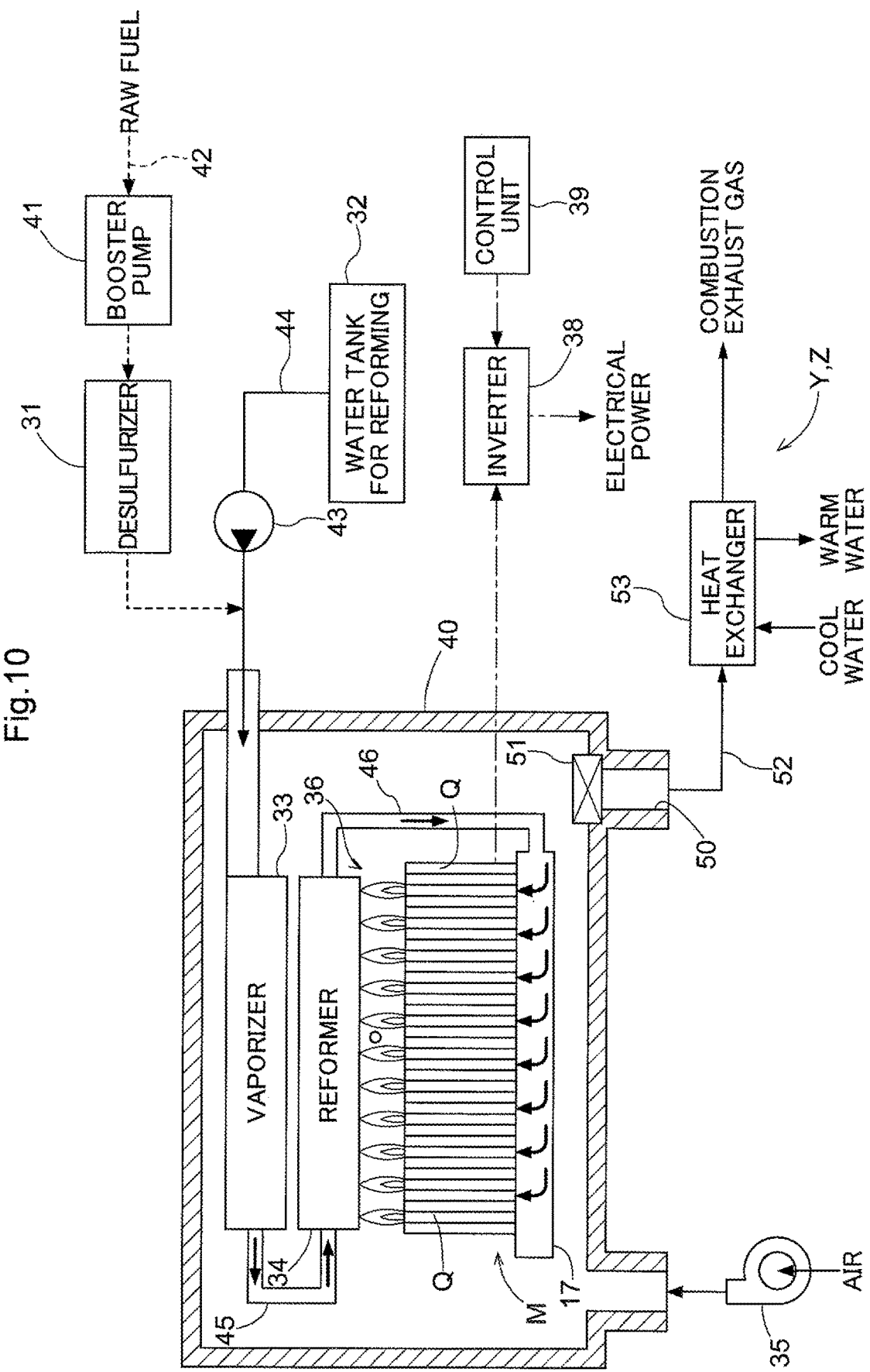
FIG. 10 is a schematic view of a structure of an electrochemical device and an energy system.

FIG. 10 shows an overview of the energy system Z and the electrochemical device Y The energy system Z has the electrochemical device Y and a heat exchanger 53 that serves as a waste heat management unit that reuses heat emitted from the electrochemical device Y The electrochemical device Y has the electrochemical module M, a fuel supply unit that has a desulfurizer 31 and a reformer 34 and supplies fuel gas containing a reducible component to the electrochemical module M, and an inverter 38 that extracts electrical power from the electrochemical module M.

Specifically, the electrochemical device Y has the desulfurizer 31, a reformed water tank 32, a vaporizer 33, the reformer 34, a blower 35, a combustion unit 36, the inverter 38, a control unit 39, a storage container 40, and the electrochemical module M.

The desulfurizer 31 removes sulfur compound components contained in a hydrocarbon-based raw fuel such as city gas (i.e., performs desulfurization). If a sulfur compound is contained in the raw fuel, the inclusion of the desulfurizer 31 makes it possible to suppress the negative influence that the sulfur compound has on the reformer 34 or the electrochemical elements Q. The vaporizer 33 produces water vapor from reformed water supplied from the reformed water tank 32. The reformer 34 uses the water vapor produced by the vaporizer 33 to perform water vapor reformation of the raw fuel desulfurized by the desulfurizer 31, thus producing reformed gas that contains hydrogen.

The electrochemical module M generates electricity by causing an electrochemical reaction to occur with use of the reformed gas supplied from the reformer 34 and air supplied from the blower 35. The combustion unit 36 mixes the reaction exhaust gas discharged from the electrochemical module M with air, and burns combustible components in the reaction exhaust gas.

The electrochemical module M has multiple electrochemical elements Q and the gas manifold 17. The electrochemical elements Q are arranged side-by-side and electrically connected to each other, and one end portion (lower end portion) of each of the electrochemical elements Q is fixed to the gas manifold 17. The electrochemical elements Q generate electricity by causing an electrochemical reaction to occur between the reformed gas supplied via the gas manifold 17 and air supplied from the blower 35.

The inverter 38 adjusts the electrical power output from the electrochemical module M to obtain the same voltage and frequency as electrical power received from a commercial power system (not shown). The control unit 39 controls the operation of the electrochemical device Y and the energy system Z.

The vaporizer 33, the reformer 34, the electrochemical module M, and the combustion unit 36 are stored in the storage container 40. Also, the reformer 34 performs reformation processing on the raw fuel with use of combustion heat produced by the combustion of reaction exhaust gas in the combustion unit 36.

The raw fuel is supplied to the desulfurizer 31 via a raw fuel supply passage 42, due to operation of a booster pump 41. The reformed water in the reformed water tank 32 is supplied to the vaporizer 33 via a reformed water supply passage 44, due to operation of a reformed water pump 43. Also, the raw fuel supply passage 42 merges with the reformed water supply passage 44 at a location on the downstream side of the desulfurizer 31, and the reformed water and the raw fuel, which have been merged outside of the storage container 40, are supplied to the vaporizer 33 provided in the storage container 40.

The reformed water is vaporized by the vaporizer 33 to produce water vapor. The raw fuel, which contains the water vapor produced by the vaporizer 33, is supplied to the reformer 34 via a vapor-containing raw fuel supply passage 45. In the reformer 34, the raw fuel is subjected to water vapor reformation, thus producing reformed gas that has hydrogen gas as a main component (first gas having a reducible component). The reformed gas produced in the reformer 34 is supplied to the gas manifold 17 of the electrochemical module M via a reformed gas supply passage 46.

The reformed gas supplied to the gas manifold 17 is distributed among the electrochemical elements Q, and is supplied to the electrochemical elements Q from the lower ends, which are the connection portions between the electrochemical elements Q and the gas manifold 17. Mainly the hydrogen (reducible component) in the reformed gas is used in the electrochemical reaction in the electrochemical elements Q. The reaction exhaust gas, which contains remaining hydrogen gas not used in the reaction, is discharged from the upper ends of the electrochemical elements Q to the combustion unit 36.

The reaction exhaust gas is burned in the combustion unit 36, and combustion exhaust gas is discharged from a combustion exhaust gas outlet 50 to the outside of the storage container 40. A combustion catalyst unit 51 (e.g., a platinum-based catalyst) is provided in the combustion exhaust gas outlet 50, and reducible components such as carbon monoxide and hydrogen contained in the combustion exhaust gas are removed by combustion. The combustion exhaust gas discharged from the combustion exhaust gas outlet 50 is sent to the heat exchanger 53 via a combustion exhaust gas discharge passage 52.

The heat exchanger 53 uses supplied cool water to perform heat exchange on the combustion exhaust gas produced by combustion in the combustion unit 36, thus producing warm water. In other words, the heat exchanger 53 operates as a waste heat management unit that reuses heat discharged from the electrochemical device Y.

Note that instead of the waste heat management unit, it is possible to provide a reaction exhaust gas using unit that uses the reaction exhaust gas that is discharged from (not burned in) the electrochemical module M. The reaction exhaust gas contains remaining hydrogen gas that was not used in the reaction in the electrochemical elements Q. In the reaction exhaust gas using unit, the remaining hydrogen gas is used to perform power generation by heat utilization through combustion, a fuel cell, or the like, thus achieving effective energy utilization.

Eleventh Embodiment

Figure 11:
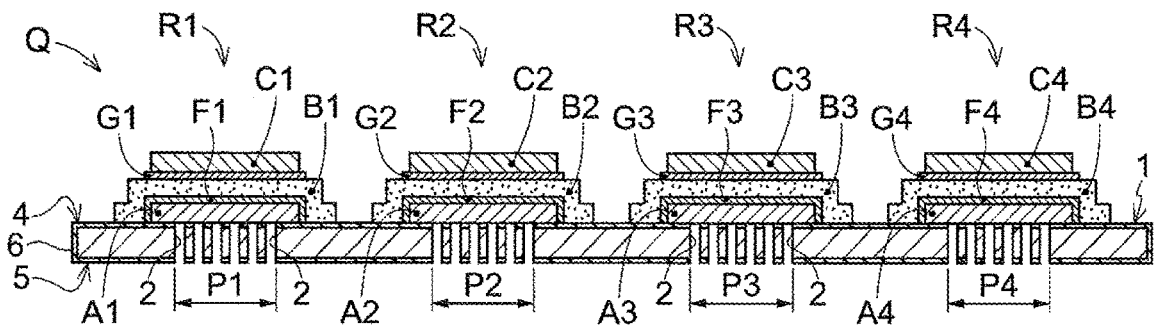
FIG. 11 is a cross-sectional view of a structure of an electrochemical element.

FIG. 11 shows an electrochemical element Q according to the present embodiment. In the present embodiment, similarly to the fourth embodiment, the electrode layer A of one electrochemical reaction portion R and the electrode layer A of another electrochemical reaction portion R are electrically connected, and thus multiple electrochemical reaction portions R are electrically connected in parallel.

The electrochemical element Q of the present embodiment is configured to have the metal substrate 1 and four electrochemical reaction portions R (first electrochemical reaction portion R1 to fourth electrochemical reaction portion R4). The electrochemical reaction portions R of the present embodiment are each configured to have an electrode layer A, an intermediate layer F, an electrolyte layer B, a reaction preventing layer G, and a counter electrode layer C.

The configuration of the metal substrate 1 of the present embodiment is similar to that of the third embodiment. In other words, the material making up the metal substrate 1 is the same as that of the metal substrate 1 according to the third embodiment. The diffusion preventing film 6 is formed on the upper surface of the metal substrate 1. Four gas flow allowing regions P (first gas flow allowing region P1 to fourth gas flow allowing region P4) are formed with gaps therebetween on the metal substrate 1.

Four electrochemical reaction portions R (first electrochemical reaction portion R1 to fourth electrochemical reaction portion R4) are formed on the upper side 4 of the metal substrate 1.

Specifically, firstly, four electrode layers A (first electrode layer A1 to fourth electrode layer A4) are formed so as to respectively cover the gas flow allowing regions P in regions larger than the gas flow allowing regions P. The four electrode layers A are formed with gaps therebetween.

Four intermediate layers F (first intermediate layer F1 to fourth intermediate layer F4) are formed so as to respectively cover the electrode layers A in regions larger than the electrode layers A. The four intermediate layers F are formed with gaps therebetween.

Also, four electrolyte layers B (first electrolyte layer B1 to fourth electrolyte layer B4) are formed so as to respectively cover the electrode layers A and the intermediate layers F in regions larger than the electrode layers A and the intermediate layers F. The four electrolyte layers B are formed with gaps therebetween.

Four reaction preventing layers G (first reaction preventing layer G1 to fourth reaction preventing layer G4) are respectively formed on the electrolyte layers B.

Four counter electrode layers C (first counter electrode layer C1 to fourth counter electrode layer C4) are respectively formed over the reaction preventing layers G.

In the present embodiment, the intermediate layer F is formed as a film between the electrode layer A and the electrolyte layer B. The film thickness can be set to, for example, approximately 1 µm to 100 µm, preferably approximately 2 µm to 50 µm, or more preferably approximately 5 µm to 20 µm. Due to setting this film thickness, it is possible to ensure sufficient performance while also achieving cost reduction by reducing the used amount of expensive material.

The material forming the intermediate layer F can be a cerium oxide-based material, a zirconia-based material, or the like. Introducing the intermediate layer F between the electrode layer A and the electrolyte layer B makes it possible to improve the performance, reliability, and durability of the electrochemical reaction portions R. Note that the intermediate layer F is preferably formed using low-temperature heating (e.g., not performing heating treatment at a high temperature such as 1400° C., but rather performing a wet process using heating treatment at a low temperature of approximately 1100° C. or lower for example), a PVD technique such as sputtering or pulse laser deposition, a CVD technique, a spray coating technique, or the like. Due to these processes that can be used in a low temperature range, a favorable intermediate layer F is obtained by performing treatment in a low temperature range of approximately 1100° C. or lower for example, without using heating in a high temperature range of 1400° C. or the like. This is preferable due to being able to suppress damage to the metal substrate 1 caused by high-temperature heating, suppress element interdiffusion between the metal substrate 1 and the electrode layer A caused by high-temperature heating, and realize an electrochemical element Q that has excellent durability.

In the present embodiment, the reaction preventing layer G is formed as a film between the electrolyte layer B and the counter electrode layer C. The film thickness can be set to, for example, approximately 1 µm to 100 µm, preferably approximately 2 µm to 50 µm, or more preferably approximately 5 µm to 20 µm. Due to setting this film thickness, it is possible to ensure sufficient performance while also achieving cost reduction by reducing the used amount of expensive material.

The material forming the reaction preventing layer G can be a cerium oxide-based material, a zirconia-based material, or the like. Introducing the reaction preventing layer G between the electrolyte layer B and the counter electrode layer C effectively suppresses reactions between the material constituting the counter electrode layer C and the material constituting the electrolyte layer B, and makes it possible to improve long-term stability in the performance of the electrochemical reaction portions R. Note that the reaction preventing layer G is preferably formed using low-temperature heating (e.g., not performing heating treatment at a high temperature such as 1400° C., but rather performing a wet process using heating treatment at a low temperature of approximately 1100° C. or lower for example), a PVD technique such as sputtering or pulse laser deposition, a CVD technique, a spray coating technique, or the like. Due to these processes that can be used in a low temperature range, a favorable reaction preventing layer G is obtained by performing treatment in a low temperature range of approximately 1100° C. or lower for example, without using heating in a high temperature range of 1400° C. or the like. This is preferable due to being able to suppress damage to the metal substrate 1 caused by high-temperature heating, suppress element interdiffusion between the metal substrate 1 and the electrode layer A caused by high-temperature heating, and realize an electrochemical element Q that has excellent durability.

The gas flow allowing regions P are each covered by an electrode layer A, and the electrode layers A (and intermediate layers F) are each covered by an electrolyte layer B, thus suppressing the case where the gas supplied from the gas flow allowing regions P to the electrode layers A leaks to the counter electrode layers C. In other words, in the present embodiment, the metal substrate 1 has multiple gas flow allowing regions P that are separated from each other, and the electrolyte layers B of the electrochemical reaction portions R are arranged so as to cover the entirety of the respective gas flow allowing regions P.

As described above, in the present embodiment, the diffusion preventing film 6 that has electrical conductivity is formed on the upper surface of the metal substrate 1. Accordingly, the electrode layers A, which are formed with gaps therebetween, are electrically connected via the metal substrate 1. In other words, in the present embodiment, the electrode layers A of adjacent electrochemical reaction portions R are electrically connected, thus electrically connecting the electrochemical reaction portions R in parallel.

Twelfth Embodiment

Figure 12:
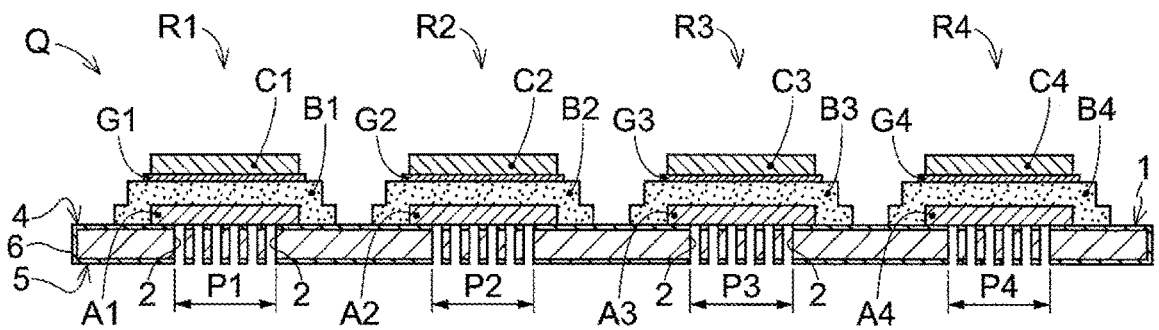
FIG. 12 is a cross-sectional view of a structure of the electrochemical element.

FIG. 12 shows an electrochemical element Q according to the present embodiment. In the present embodiment, similarly to the eleventh embodiment, the electrode layer A of one electrochemical reaction portion R and the electrode layer A of another electrochemical reaction portion R are electrically connected, and thus multiple electrochemical reaction portions R are electrically connected in parallel.

Unlike the eleventh embodiment, the intermediate layers F are not provided in the electrochemical reaction portions R of the present embodiment. In other words, the electrochemical reaction portions R of the present embodiment are each configured to have an electrode layer A, an electrolyte layer B, a reaction preventing layer G, and a counter electrode layer C. With the exception of the intermediate layer F, the configuration is similar to that of the eleventh embodiment.

The gas flow allowing regions P are each covered by an electrode layer A, and the electrode layers A are each covered by an electrolyte layer B, thus suppressing the case where the gas supplied from the gas flow allowing regions P to the electrode layers A leaks to the counter electrode layers C. In other words, in the present embodiment, the metal substrate 1 has multiple gas flow allowing regions P that are separated from each other, and the electrolyte layers B of the electrochemical reaction portions R are arranged so as to cover the entirety of the respective gas flow allowing regions P.

As described above, in the present embodiment, the diffusion preventing film 6 that has electrical conductivity is formed on the upper surface of the metal substrate 1. Accordingly, the electrode layers A, which are formed with gaps therebetween, are electrically connected via the metal substrate 1. In other words, in the present embodiment, the electrode layers A of adjacent electrochemical reaction portions R are electrically connected, thus electrically connecting the electrochemical reaction portions R in parallel.

Thirteenth Embodiment

Figure 13:
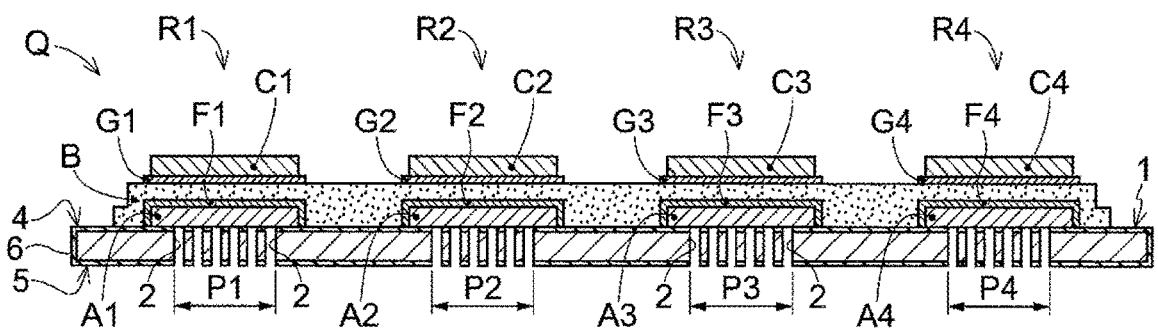
FIG. 13 is a cross-sectional view of a structure of the electrochemical element.

FIG. 13 shows an electrochemical element Q according to the present embodiment. In the present embodiment, similarly to the eleventh embodiment, the electrode layer A of one electrochemical reaction portion R and the electrode layer A of another electrochemical reaction portion R are electrically connected, and thus multiple electrochemical reaction portions R are electrically connected in parallel.

Unlike the eleventh embodiment, in the electrochemical reaction portions R of the present embodiment, the electrolyte layer B is provided so as to span multiple electrochemical reaction portions R. With the exception of the electrolyte layer B, the configuration is similar to that of the eleventh embodiment.

Specifically, the electrolyte layer B is formed as a single continuous layer that covers the entirety of the four electrode layers A (first electrode layer A1 to fourth electrode layer A4), and the four intermediate layers F (first intermediate layer F1 to fourth intermediate layer F4). The four gas flow allowing regions P (first gas flow allowing region P1 to fourth gas flow allowing region P4) and the four electrode layers A (first electrode layer A1 to fourth electrode layer A4) are covered by the electrolyte layer B. Accordingly, this suppresses the case where the gas supplied to the electrode layers A leaks to the counter electrode layers C. Also, the four reaction preventing layers G (first reaction preventing layer G1 to fourth reaction preventing layer G4) and the four counter electrode layers C (first counter electrode layer C1 to fourth counter electrode layer C4) are formed in the regions that correspond to the electrode layers A on the electrolyte layer B.

Because the four electrode layers A and the four counter electrode layers C are formed with gaps therebetween, an electrochemical reaction can occur between the opposing electrode layers A and counter electrode layers C and the electrolyte layer B sandwiched therebetween. In other words, the first electrochemical reaction portion R1 is formed by the first electrode layer A1, the first counter electrode layer C1, and the portion sandwiched therebetween (the first intermediate layer F1, the electrolyte layer B, and the first reaction preventing layer G1). Similarly, the second electrochemical reaction portion R2 to the fourth electrochemical reaction portion R4 are formed by the second to fourth electrode layers A2 to A4, the second to fourth counter electrode layers C2 to C4, and the portions sandwiched therebetween (the second to fourth intermediate layers F2 to F4, the electrolyte layer B, and the second to fourth reaction preventing layers G2 to G4). In other words, in the present embodiment, multiple electrochemical reaction portions R are arranged on the upper side 4 of the metal substrate 1.

Similarly to the third embodiment, the electrode layers A, which are formed with gaps therebetween, are electrically connected via the metal substrate 1. Accordingly, it can be said that the electrochemical reaction portions R are electrically connected in parallel.

Fourteenth Embodiment

Figure 14:
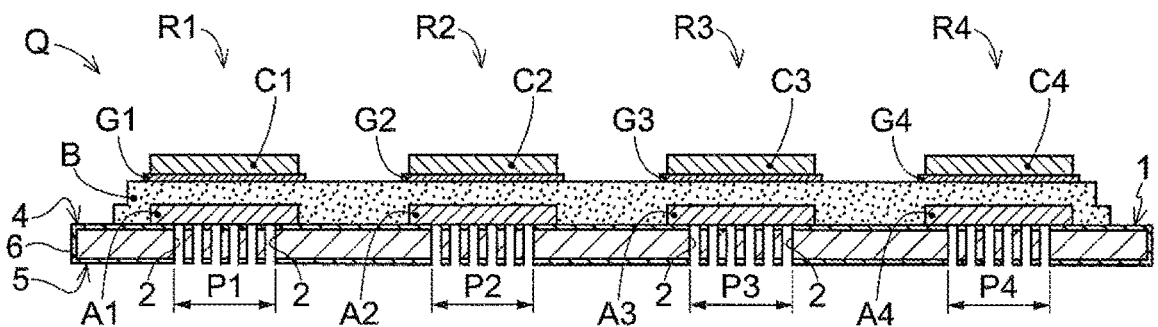
FIG. 14 is a cross-sectional view of a structure of the electrochemical element.

FIG. 14 shows an electrochemical element Q according to the present embodiment. In the present embodiment, similarly to the thirteenth embodiment, the electrode layer A of one electrochemical reaction portion R and the electrode layer A of another electrochemical reaction portion R are electrically connected, and thus multiple electrochemical reaction portions R are electrically connected in parallel.

Unlike the thirteenth embodiment, the intermediate layers F are not provided in the electrochemical reaction portions R of the present embodiment. In other words, the electrochemical reaction portions R of the present embodiment are each configured to have an electrode layer A, an electrolyte layer B, a reaction preventing layer G, and a counter electrode layer C. With the exception of the intermediate layer F, the configuration is similar to that of the thirteenth embodiment.

The gas flow allowing regions P are each covered by an electrode layer A, and the electrode layers A are each covered by an electrolyte layer B, thus suppressing the case where the gas supplied from the gas flow allowing regions P to the electrode layers A leaks to the counter electrode layers C. In other words, in the present embodiment, the metal substrate 1 has multiple gas flow allowing regions P that are separated from each other, and the electrolyte layers B of the electrochemical reaction portions R are arranged so as to cover the entirety of the respective gas flow allowing regions P.

As described above, in the present embodiment, the diffusion preventing film 6 that has electrical conductivity is formed on the upper surface of the metal substrate 1. Accordingly, the multiple electrode layers A, which are formed with gaps therebetween, are electrically connected via the metal substrate 1. In other words, in the present embodiment, the electrode layers A of adjacent electrochemical reaction portions R are electrically connected, thus electrically connecting the electrochemical reaction portions R in parallel.

Fifteenth Embodiment

Figure 15:
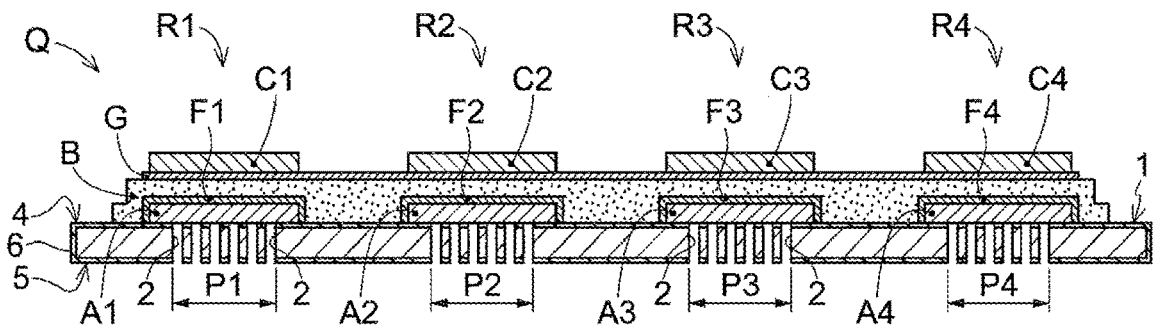
FIG. 15 is a cross-sectional view of a structure of the electrochemical element.

FIG. 15 shows an electrochemical element Q according to the present embodiment. In the present embodiment, similarly to the eleventh embodiment, the electrode layer A of one electrochemical reaction portion R and the electrode layer A of another electrochemical reaction portion R are electrically connected, and thus multiple electrochemical reaction portions R are electrically connected in parallel.

Unlike the eleventh embodiment, in the electrochemical reaction portions R of the present embodiment, the electrolyte layer B and the reaction preventing layer G are provided so as to span multiple electrochemical reaction portions R. With the exception of the electrolyte layer B and the reaction preventing layer G, the configuration is similar to that of the eleventh embodiment.

Specifically, the electrolyte layer B is formed as a single continuous layer that covers the entirety of the four electrode layers A (first electrode layer A1 to fourth electrode layer A4), and the four intermediate layers F (first intermediate layer F1 to fourth intermediate layer F4). The four gas flow allowing regions P (first gas flow allowing region P1 to fourth gas flow allowing region P4) and the four electrode layers A (first electrode layer A1 to fourth electrode layer A4) are covered by the electrolyte layer B. Accordingly, this suppresses the case where the gas supplied to the electrode layers A leaks to the counter electrode layers C.

The reaction preventing layer G is formed on the electrolyte layer B as a single continuous layer that covers the entirety of the four electrode layers A (first electrode layer A1 to fourth electrode layer A4), and the four intermediate layers F (first intermediate layer F1 to fourth intermediate layer F4). Four counter electrode layers C (first counter electrode layer C1 to fourth counter electrode layer C4) are respectively formed over the reaction preventing layer G, in regions corresponding to the electrode layers A.

Because the four electrode layers A and the four counter electrode layers C are formed with gaps therebetween, an electrochemical reaction can occur between the opposing electrode layers A and counter electrode layers C and the electrolyte layer B sandwiched therebetween. In other words, the first electrochemical reaction portion R1 is formed by the first electrode layer A1, the first counter electrode layer C1, and the portion sandwiched therebetween (the first intermediate layer F1, the electrolyte layer B, and the reaction preventing layer G). Similarly, the second electrochemical reaction portion R2 to the fourth electrochemical reaction portion R4 are formed by the second to fourth electrode layers A2 to A4, the second to fourth counter electrode layers C2 to C4, and the portions sandwiched therebetween (the second to fourth intermediate layers F2 to F4, the electrolyte layer B, and the reaction preventing layer G). In other words, in the present embodiment, multiple electrochemical reaction portions R are arranged on the upper side 4 of the metal substrate 1.

Similarly to the third embodiment, the multiple electrode layers A, which are formed with gaps therebetween, are electrically connected via the metal substrate 1. Accordingly, it can be said that the electrochemical reaction portions R are electrically connected in parallel.

Sixteenth Embodiment

Figure 16:
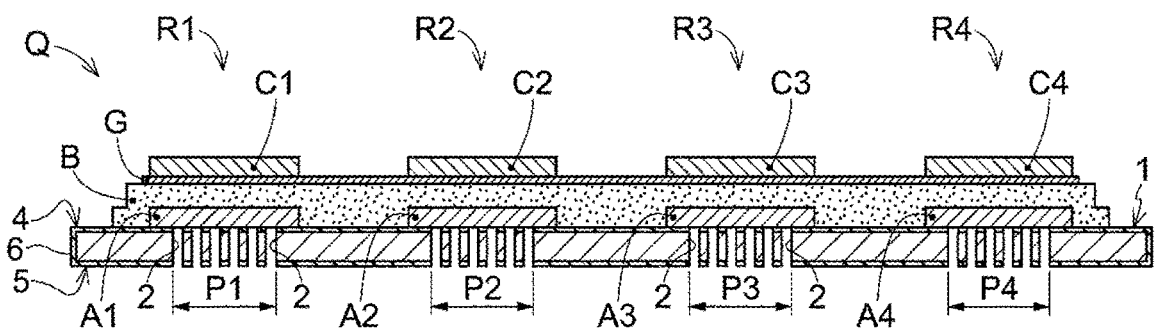
FIG. 16 is a cross-sectional view of a structure of the electrochemical element.

FIG. 16 shows an electrochemical element Q according to the present embodiment. In the present embodiment, similarly to the fifteenth embodiment, the electrode layer A of one electrochemical reaction portion R and the electrode layer A of another electrochemical reaction portion R are electrically connected, and thus multiple electrochemical reaction portions R are electrically connected in parallel.

Unlike the fifteenth embodiment, the intermediate layers F are not provided in the electrochemical reaction portions R of the present embodiment. In other words, the electrochemical reaction portions R of the present embodiment are each configured to have an electrode layer A, an electrolyte layer B, a reaction preventing layer G, and a counter electrode layer C. With the exception of the intermediate layer F, the configuration is similar to that of the fifteenth embodiment.

The gas flow allowing regions P are each covered by an electrode layer A, and the electrode layers A are each covered by an electrolyte layer B, thus suppressing the case where the gas supplied from the gas flow allowing regions P to the electrode layers A leaks to the counter electrode layers C. In other words, in the present embodiment, the metal substrate 1 has multiple gas flow allowing regions P that are separated from each other, and the electrolyte layers B of the electrochemical reaction portions R are arranged so as to cover the entirety of the respective gas flow allowing regions P.

As described above, in the present embodiment, the diffusion preventing film 6 that has electrical conductivity is formed on the upper surface of the metal substrate 1. Accordingly, the electrode layers A, which are formed with gaps therebetween, are electrically connected via the metal substrate 1. In other words, in the present embodiment, the electrode layers A of adjacent electrochemical reaction portions R are electrically connected, thus electrically connecting the electrochemical reaction portions R in parallel.

Seventeenth Embodiment

Figure 17:
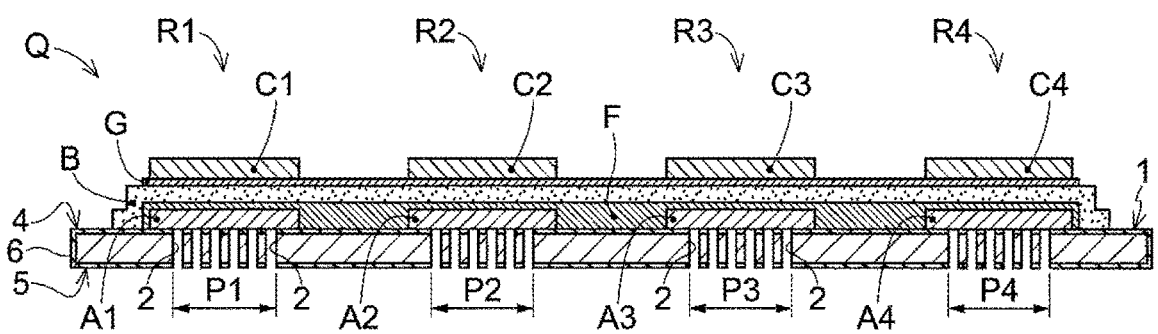
FIG. 17 is a cross-sectional view of a structure of the electrochemical element.

FIG. 17 shows an electrochemical element Q according to the present embodiment. In the present embodiment, similarly to the eleventh embodiment, the electrode layer A of one electrochemical reaction portion R and the electrode layer A of another electrochemical reaction portion R are electrically connected, and thus multiple electrochemical reaction portions R are electrically connected in parallel.

Unlike the eleventh embodiment, in the electrochemical reaction portions R of the present embodiment, the intermediate layer F, the electrolyte layer B, and the reaction preventing layer G are provided so as to span multiple electrochemical reaction portions R. With the exception of the intermediate layer F, the electrolyte layer B, and the reaction preventing layer G, the configuration is similar to that of the eleventh embodiment.

Specifically, the intermediate layer F is formed as a single continuous layer that covers the entirety of the four electrode layers A (first electrode layer A1 to fourth electrode layer A4). Also, the electrolyte layer B is formed as a single continuous layer that covers the entirety of the four electrode layers A (first electrode layer A1 to fourth electrode layer A4) and the intermediate layer F. The four gas flow allowing regions P (first gas flow allowing region P1 to fourth gas flow allowing region P4) and the four electrode layers A (first electrode layer A1 to fourth electrode layer A4) are covered by the electrolyte layer B. Accordingly, this suppresses the case where the gas supplied to the electrode layers A leaks to the counter electrode layers C.

The reaction preventing layer G is formed on the electrolyte layer B as a single continuous layer that covers the entirety of the four electrode layers A (first electrode layer A1 to fourth electrode layer A4) and the intermediate layer F. Four counter electrode layers C (first counter electrode layer C1 to fourth counter electrode layer C4) are respectively formed over the reaction preventing layer G, in regions corresponding to the electrode layers A.

Because the four electrode layers A and the four counter electrode layers C are formed with gaps therebetween, an electrochemical reaction can occur between the opposing electrode layers A and counter electrode layers C and the electrolyte layer B sandwiched therebetween. In other words, the first electrochemical reaction portion R1 is formed by the first electrode layer A1, the first counter electrode layer C1, and the portion sandwiched therebetween (the intermediate layer F, the electrolyte layer B, and the reaction preventing layer G). Similarly, the second to fourth electrochemical reaction portions R2 to R4 are formed by the second to fourth electrode layers A2 to A4, the second to fourth counter electrode layers C2 to C4, and the portions sandwiched therebetween (the intermediate layer F, the electrolyte layer B, and the reaction preventing layer G). In other words, in the present embodiment, multiple electrochemical reaction portions R are arranged on the upper side 4 of the metal substrate 1.

Similarly to the third embodiment, the multiple electrode layers A, which are formed with gaps therebetween, are electrically connected via the metal substrate 1. Accordingly, it can be said that the electrochemical reaction portions R are electrically connected in parallel.

Eighteenth Embodiment

Figure 18:
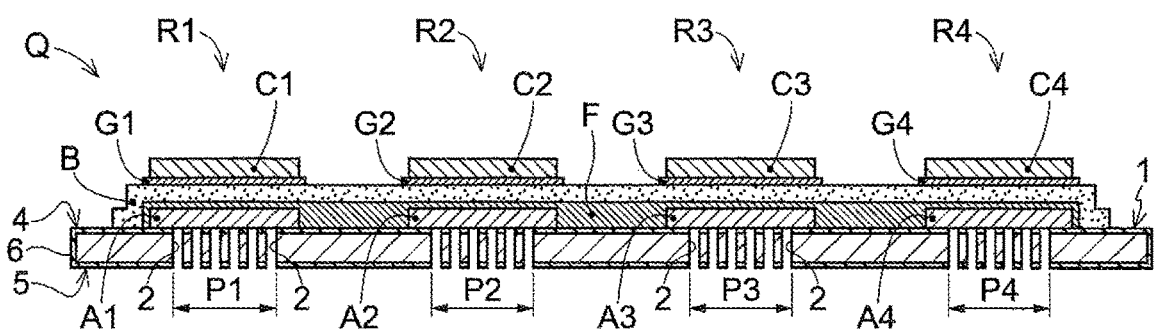
FIG. 18 is a cross-sectional view of a structure of the electrochemical element.

FIG. 18 shows an electrochemical element Q according to the present embodiment. In the present embodiment, similarly to the eleventh embodiment, the electrode layer A of one electrochemical reaction portion R and the electrode layer A of another electrochemical reaction portion R are electrically connected, and thus multiple electrochemical reaction portions R are electrically connected in parallel.

Unlike the eleventh embodiment, in the electrochemical reaction portions R of the present embodiment, the intermediate layer F and the electrolyte layer B are provided so as to span multiple electrochemical reaction portions R. With the exception of the intermediate layer F and the electrolyte layer B, the configuration is similar to that of the eleventh embodiment.

Specifically, the intermediate layer F is formed as a single continuous layer that covers the entirety of the four electrode layers A (first electrode layer A1 to fourth electrode layer A4). Also, the electrolyte layer B is formed as a single continuous layer that covers the entirety of the four electrode layers A (first electrode layer A1 to fourth electrode layer A4) and the intermediate layer F. The four gas flow allowing regions P (first gas flow allowing region P1 to fourth gas flow allowing region P4) and the four electrode layers A (first electrode layer A1 to fourth electrode layer A4) are covered by the electrolyte layer B. Accordingly, this suppresses the case where the gas supplied to the electrode layers A leaks to the counter electrode layers C.

Also, the four reaction preventing layers G (first reaction preventing layer G1 to fourth reaction preventing layer G4) and the four counter electrode layers C (first counter electrode layer C1 to fourth counter electrode layer C4) are formed in the regions that correspond to the electrode layers A on the electrolyte layer B.

Because the four electrode layers A and the four counter electrode layers C are formed with gaps therebetween, an electrochemical reaction can occur between the opposing electrode layers A and counter electrode layers C and the electrolyte layer B sandwiched therebetween. In other words, the first electrochemical reaction portion R1 is formed by the first electrode layer A1, the first counter electrode layer C1, and the portion sandwiched therebetween (the intermediate layer F, the electrolyte layer B, and the first reaction preventing layer G1). Similarly, the second electrochemical reaction portion R2 to the fourth electrochemical reaction portion R4 are formed by the second to fourth electrode layers A2 to A4, the second to fourth counter electrode layers C2 to C4, and the portions sandwiched therebetween (the intermediate layer F, the electrolyte layer B, and the second to fourth reaction preventing layers G2 to G4). In other words, in the present embodiment, multiple electrochemical reaction portions R are arranged on the upper side 4 of the metal substrate 1.

Similarly to the third embodiment, the multiple electrode layers A, which are formed with gaps therebetween, are electrically connected via the metal substrate 1. Accordingly, it can be said that the electrochemical reaction portions R are electrically connected in parallel.

Nineteenth Embodiment

Figure 19:
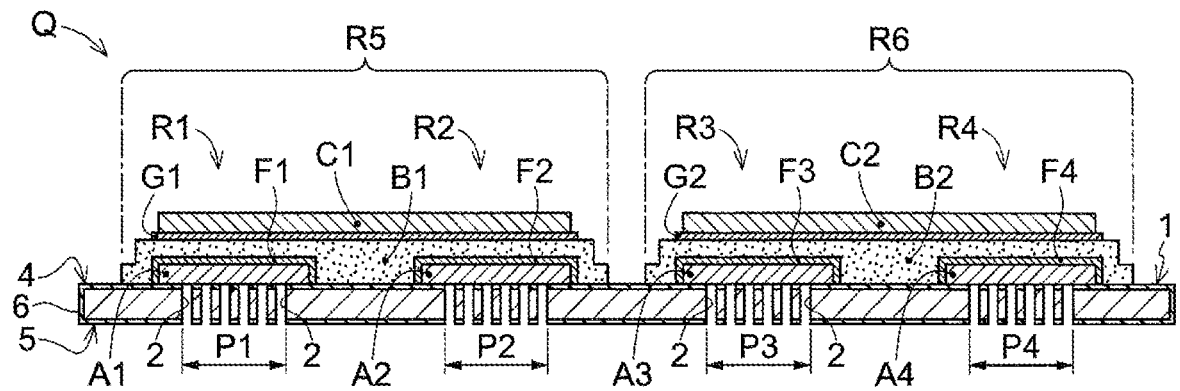
FIG. 19 is a cross-sectional view of a structure of the electrochemical element.

FIG. 19 shows an electrochemical element Q according to the present embodiment. The electrochemical element Q according to the present embodiment is configured to have the metal substrate 1, electrode layers A, intermediate layers F, electrolyte layers B, reaction preventing layers G, and counter electrode layers C. The electrode layers A, the intermediate layers F, the electrolyte layers B, the reaction preventing layers G, and the counter electrode layers C constitute electrochemical reaction portions R.

The configuration of the metal substrate 1 of the present embodiment is similar to that of the third embodiment. In other words, the material making up the metal substrate 1 is the same as that of the metal substrate 1 according to the third embodiment. The diffusion preventing film 6 is formed on the upper surface of the metal substrate 1. Four gas flow allowing regions P (first gas flow allowing region P1 to fourth gas flow allowing region P4) are formed with gaps therebetween on the metal substrate 1.

Four electrode layers A (first electrode layer A1 to fourth electrode layer A4) are formed so as to respectively cover each of the gas flow allowing regions P in regions larger than each of the gas flow allowing regions P. The four electrode layers A are formed with gaps therebetween.

Four intermediate layers F (first intermediate layer F1 to fourth intermediate layer F4) are formed so as to respectively cover each of the electrode layers A in regions larger than each of the electrode layers A. The four intermediate layers F are formed with gaps therebetween.

The first electrolyte layer B1 is formed as a single continuous layer that covers the entirety of the first electrode layer A1 and the second electrode layer A2. Two gas flow allowing regions P (first gas flow allowing region P1 and second gas flow allowing region P2) and two electrode layers A (first electrode layer A1 and second electrode layer A2) are covered by the first electrolyte layer B1. Accordingly, this suppresses the case where the gas supplied to the electrode layers A leaks to the counter electrode layers C.

The second electrolyte layer B2 is formed as a single continuous layer that covers the entirety of the third electrode layer A3 and the fourth electrode layer A4. Two gas flow allowing regions P (third gas flow allowing region P3 and fourth gas flow allowing region P4) and two electrode layers A (third electrode layer A3 and fourth electrode layer A4) are covered by the second electrolyte layer B2. Accordingly, this suppresses the case where the gas supplied to the electrode layers A leaks to the counter electrode layers C.

The first reaction preventing layer G1 is formed on the first electrolyte layer B1 as a single continuous layer that covers the entirety of two electrode layers A (first electrode layer A1 and second electrode layer A2) and two intermediate layers F (first intermediate layer F1 and second intermediate layer F2).

The second reaction preventing layer G2 is formed on the second electrolyte layer B2 as a single continuous layer that covers the entirety of two electrode layers A (third electrode layer A3 and fourth electrode layer A4) and two intermediate layers F (third intermediate layer F3 and fourth intermediate layer F4).

The first counter electrode layer C1 is formed on the first reaction preventing layer G1 as a single continuous layer that covers the entirety of two electrode layers A (first electrode layer A1 and second electrode layer A2) and two intermediate layers F (first intermediate layer F1 and second intermediate layer F2).

The second counter electrode layer C2 is formed on the second reaction preventing layer G2 as a single continuous layer that covers the entirety of two electrode layers A (third electrode layer A3 and fourth electrode layer A4) and two intermediate layers F (third intermediate layer F3 and fourth intermediate layer F4).

In the present embodiment, the four electrode layers A are formed with gaps therebetween. An electrochemical reaction can occur due to the four electrode layers A (first electrode layer A1 to fourth electrode layer A4), the electrolyte layers B, and the counter electrode layers C (first counter electrode layer C1 and second counter electrode layer C2). Accordingly, it is understood that the first electrochemical reaction portion R1 is constituted by the first electrode layer A1, the left half of the first counter electrode layer C1, and the portion sandwiched therebetween (first intermediate layer F1, first electrolyte layer B1, and first reaction preventing layer G1).

It is understood that the second electrochemical reaction portion R2 is constituted by the second electrode layer A2, the right half of the first counter electrode layer C1, and the portion sandwiched therebetween (second intermediate layer F2, first electrolyte layer B1, and first reaction preventing layer G1).

It is understood that the third electrochemical reaction portion R3 is constituted by the third electrode layer A3, the left half of the second counter electrode layer C2, and the portion sandwiched therebetween (third intermediate layer F3, second electrolyte layer B2, and second reaction preventing layer G2).

It is understood that the fourth electrochemical reaction portion R4 is constituted by the fourth electrode layer A4, the right half of the second counter electrode layer C2, and the portion sandwiched therebetween (fourth intermediate layer F4, second electrolyte layer B2, and second reaction preventing layer G2).

In other words, in the present embodiment, multiple electrochemical reaction portions R are arranged on the upper side 4 of the metal substrate 1.

Also, in the present embodiment, the two counter electrode layers C are formed with gaps therebetween. An electrochemical reaction can occur due to the two counter electrode layers C (first counter electrode layer C1 and second counter electrode layer C2), the electrolyte layers B, and the electrode layers A (first electrode layer A1 to fourth electrode layer A4). Accordingly, it is understood that a fifth electrochemical reaction portion R5 is constituted by the first electrode layer A1 and the second electrode layer A2, the first counter electrode layer C1, and the portion sandwiched therebetween (first intermediate layer F1 and second intermediate layer F2, first electrolyte layer B1, and first reaction preventing layer G1).

It is understood that a sixth electrochemical reaction portion R6 is constituted by the third electrode layer A3 and the fourth electrode layer A4, the second counter electrode layer C2, and the portion sandwiched therebetween (third intermediate layer F3 and fourth intermediate layer F4, second electrolyte layer B2, and second reaction preventing layer G2).

In other words, in the present embodiment, multiple electrochemical reaction portions R are arranged on the upper side 4 of the metal substrate 1.

As with the fifth electrochemical reaction portion R5 and the sixth electrochemical reaction portion R6 of the present embodiment, there are cases where multiple gas flow allowing regions P correspond to one electrochemical reaction portion R. In this case as well, the electrolyte layer B of the electrochemical reaction portion R is arranged so as to cover the entirety of each of the gas flow allowing regions P. Accordingly, it is possible to suppress the case where the gas supplied from the lower side of the metal substrate 1 to the electrode layers A through the gas flow allowing regions P leaks to the upper side of the metal substrate 1, and it is possible to raise the performance and reliability of the electrochemical element. Specifically, the first electrolyte layer B1 of the fifth electrochemical reaction portion R5 is arranged so as to cover the entirety of the first gas flow allowing region P1 and the second gas flow allowing region P2. The second electrolyte layer B2 of the sixth electrochemical reaction portion R6 is arranged so as to cover the entirety of the third gas flow allowing region P3 and the fourth gas flow allowing region P4.

Twentieth Embodiment

Figure 20:
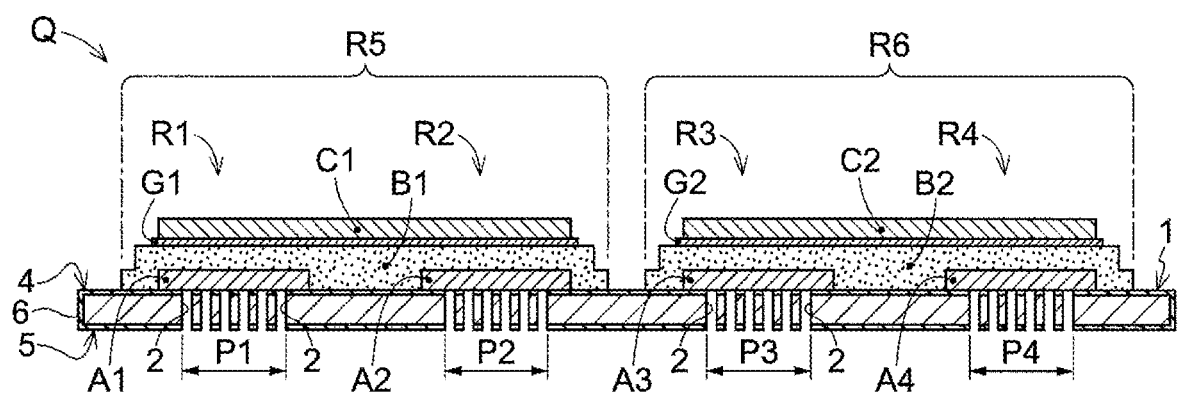
FIG. 20 is a cross-sectional view of a structure of the electrochemical element.

FIG. 20 shows an electrochemical element Q according to the present embodiment. The electrochemical element Q according to the present embodiment is configured to have the metal substrate 1, electrode layers A, electrolyte layers B, reaction preventing layers G, and counter electrode layers C. Unlike the nineteenth embodiment, the intermediate layers F are not provided in the electrochemical reaction portions R of the present embodiment. In other words, the electrochemical reaction portions R of the present embodiment are each configured to have an electrode layer A, an electrolyte layer B, a reaction preventing layer G, and a counter electrode layer C. With the exception of the intermediate layer F, the configuration is similar to that of the nineteenth embodiment.

The first electrolyte layer B1 is formed as a single continuous layer that covers the entirety of the first electrode layer A1 and the second electrode layer A2. Two gas flow allowing regions P (first gas flow allowing region P1 and second gas flow allowing region P2) and two electrode layers A (first electrode layer A1 and second electrode layer A2) are covered by the first electrolyte layer B1. Accordingly, this suppresses the case where the gas supplied to the electrode layers A leaks to the counter electrode layers C.

The second electrolyte layer B2 is formed as a single continuous layer that covers the entirety of the third electrode layer A3 and the fourth electrode layer A4. Two gas flow allowing regions P (third gas flow allowing region P3 and fourth gas flow allowing region P4) and two electrode layers A (third electrode layer A3 and fourth electrode layer A4) are covered by the second electrolyte layer B2. Accordingly, this suppresses the case where the gas supplied to the electrode layers A leaks to the counter electrode layers C.

In the present embodiment, the four electrode layers A are formed with gaps therebetween. An electrochemical reaction can occur due to the four electrode layers A (first electrode layer A1 to fourth electrode layer A4), the electrolyte layers B, and the counter electrode layers C (first counter electrode layer C1 and second counter electrode layer C2). Accordingly, it is understood that the first electrochemical reaction portion R1 is constituted by the first electrode layer A1, the left half of the first counter electrode layer C1, and the portion sandwiched therebetween (first electrolyte layer B1 and first reaction preventing layer G1).

It is understood that the second electrochemical reaction portion R2 is constituted by the second electrode layer A2, the right half of the first counter electrode layer C1, and the portion sandwiched therebetween (first electrolyte layer B1 and first reaction preventing layer G1).

It is understood that the third electrochemical reaction portion R3 is constituted by the third electrode layer A3, the left half of the second counter electrode layer C2, and the portion sandwiched therebetween (second electrolyte layer B2 and second reaction preventing layer G2).

It is understood that the fourth electrochemical reaction portion R4 is constituted by the second electrode layer A4, the right half of the second counter electrode layer C2, and the portion sandwiched therebetween (second electrolyte layer B2 and second reaction preventing layer G2).

In other words, in the present embodiment, multiple electrochemical reaction portions R are arranged on the upper side 4 of the metal substrate 1.

Also, in the present embodiment, the two counter electrode layers C are formed with gaps therebetween. An electrochemical reaction can occur due to the two counter electrode layers C (first counter electrode layer C1 and second counter electrode layer C2), the electrolyte layers B, and the electrode layers A (first electrode layer A1 to fourth electrode layer A4). Accordingly, it is understood that the fifth electrochemical reaction portion R5 is constituted by the first electrode layer A1 and the second electrode layer A2, the first counter electrode layer C1, and the portion sandwiched therebetween (first electrolyte layer B1 and first reaction preventing layer G1).

It is understood that the sixth electrochemical reaction portion R6 is constituted by the third electrode layer A3 and the fourth electrode layer A4, the second counter electrode layer C2, and the portion sandwiched therebetween (second electrolyte layer B2 and second reaction preventing layer G2).

In other words, in the present embodiment, multiple electrochemical reaction portions R are arranged on the upper side 4 of the metal substrate 1.

Twenty-First Embodiment

Figure 21:
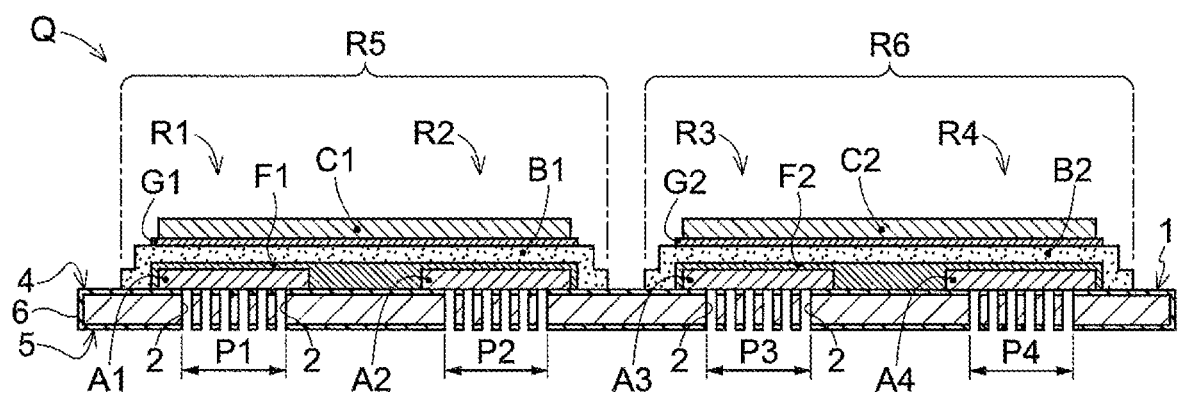
FIG. 21 is a cross-sectional view of a structure of the electrochemical element.

FIG. 21 shows an electrochemical element Q according to the present embodiment. The electrochemical element Q according to the present embodiment is configured to have the metal substrate 1, electrode layers A, intermediate layers F, electrolyte layers B, reaction preventing layers G, and counter electrode layers C. The electrode layers A, the intermediate layers F, the electrolyte layers B, the reaction preventing layers G, and the counter electrode layers C constitute electrochemical reaction portions R.

The configuration of the electrochemical element Q according to the present embodiment is similar to that of the nineteenth embodiment. A difference from the nineteenth embodiment is that the intermediate layer F is provided spanning multiple electrode layers A. The first intermediate layer F1 is formed as a single continuous layer that covers the entirety of the first electrode layer A1 and the second electrode layer A2. The second intermediate layer F2 is formed as a single continuous layer that covers the entirety of the third electrode layer A3 and the fourth electrode layer A4.

The first electrolyte layer B1 is formed as a single continuous layer that covers the entirety of the first electrode layer A1 and the second electrode layer A2. Two gas flow allowing regions P (first gas flow allowing region P1 and second gas flow allowing region P2) and two electrode layers A (first electrode layer A1 and second electrode layer A2) are covered by the first electrolyte layer B1. Accordingly, this suppresses the case where the gas supplied to the electrode layers A leaks to the counter electrode layers C.

The second electrolyte layer B2 is formed as a single continuous layer that covers the entirety of the third electrode layer A3 and the fourth electrode layer A4. Two gas flow allowing regions P (third gas flow allowing region P3 and fourth gas flow allowing region P4) and two electrode layers A (third electrode layer A3 and fourth electrode layer A4) are covered by the second electrolyte layer B2. Accordingly, this suppresses the case where the gas supplied to the electrode layers A leaks to the counter electrode layers C.

In the present embodiment, the four electrode layers A are formed with gaps therebetween. An electrochemical reaction can occur due to the four electrode layers A (first electrode layer A1 to fourth electrode layer A4), the electrolyte layers B, and the counter electrode layers C (first counter electrode layer C1 and second counter electrode layer C2). Accordingly, it is understood that the first electrochemical reaction portion R1 is constituted by the first electrode layer A1, the left half of the first counter electrode layer C1, and the portion sandwiched therebetween (first intermediate layer F1, first electrolyte layer B1, and first reaction preventing layer G1).

It is understood that the second electrochemical reaction portion R2 is constituted by the second electrode layer A2, the right half of the first counter electrode layer C1, and the portion sandwiched therebetween (first intermediate layer F1, first electrolyte layer B1, and first reaction preventing layer G1).

It is understood that the third electrochemical reaction portion R3 is constituted by the third electrode layer A3, the left half of the second counter electrode layer C2, and the portion sandwiched therebetween (second intermediate layer F2, second electrolyte layer B2, and second reaction preventing layer G2).

It is understood that the fourth electrochemical reaction portion R4 is constituted by the fourth electrode layer A4, the right half of the second counter electrode layer C2, and the portion sandwiched therebetween (second intermediate layer F2, second electrolyte layer B2, and second reaction preventing layer G2).

In other words, in the present embodiment, multiple electrochemical reaction portions R are arranged on the upper side 4 of the metal substrate 1.

Also, in the present embodiment, the two counter electrode layers C are formed with gaps therebetween. An electrochemical reaction can occur due to the two counter electrode layers C (first counter electrode layer C1 and second counter electrode layer C2), the electrolyte layers B, and the electrode layers A (first electrode layer A1 to fourth electrode layer A4). Accordingly, it is understood that the fifth electrochemical reaction portion R5 is constituted by the first electrode layer A1 and the second electrode layer A2, the first counter electrode layer C1, and the portion sandwiched therebetween (first intermediate layer F1, first electrolyte layer B1, and first reaction preventing layer G1).

It is understood that the sixth electrochemical reaction portion R6 is constituted by the third electrode layer A3 and the fourth electrode layer A4, the second counter electrode layer C2, and the portion sandwiched therebetween (second intermediate layer F2, second electrolyte layer B2, and second reaction preventing layer G2).

In other words, in the present embodiment, multiple electrochemical reaction portions R are arranged on the upper side 4 of the metal substrate 1.

Twenty-Second Embodiment

Figure 22:
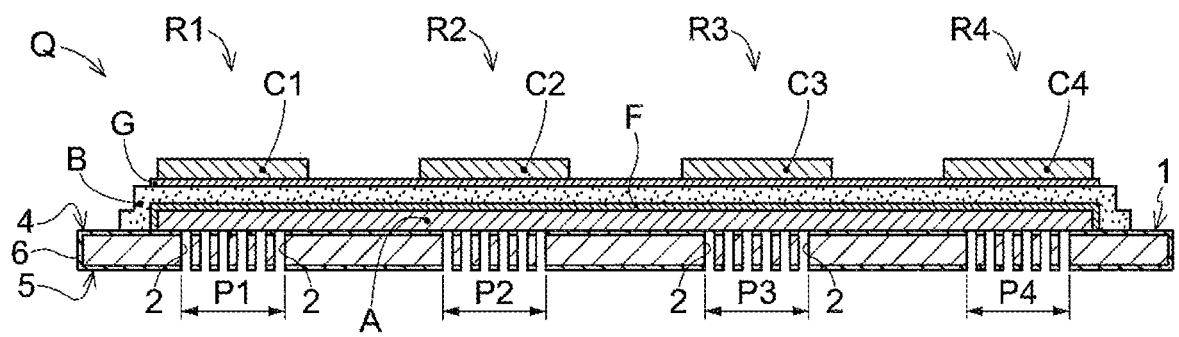
FIG. 22 is a cross-sectional view of a structure of the electrochemical element.

FIG. 22 shows an electrochemical element Q according to the present embodiment. The electrochemical element Q according to the present embodiment is configured to have the metal substrate 1, an electrode layer A, an intermediate layer F, an electrolyte layer B, a reaction preventing layer G, and counter electrode layers C. The electrode layer A, the intermediate layer F, the electrolyte layer B, the reaction preventing layer G, and the counter electrode layers C constitute electrochemical reaction portions R.

The configuration of the metal substrate 1 of the present embodiment is similar to that of the third embodiment. In other words, the material making up the metal substrate 1 is the same as that of the metal substrate 1 according to the third embodiment. The diffusion preventing film 6 is formed on the upper surface of the metal substrate 1. Four gas flow allowing regions P (first gas flow allowing region P1 to fourth gas flow allowing region P4) are formed with gaps therebetween on the metal substrate 1.

The electrode layer A is formed as a single layer that covers the entirety of four gas flow allowing regions P (first gas flow allowing region P1 to fourth gas flow allowing region P4).

The intermediate layer F is formed as a single continuous layer that covers the entirety of the electrode layer A.

The electrolyte layer B is formed as a single continuous layer that covers the entirety of the electrode layer A and the intermediate layer F. The four gas flow allowing regions P (first gas flow allowing region P1 to fourth gas flow allowing region P4) and the electrode layer A are covered by the electrolyte layer B. Accordingly, this suppresses the case where the gas supplied to the electrode layers A leaks to the counter electrode layers C.

The reaction preventing layer G is formed on the electrolyte layer B as a single continuous layer that covers the entirety of the electrode layer A and the intermediate layer F.

Four counter electrode layers C (first counter electrode layer C1 to fourth counter electrode layer C4) are formed on the reaction preventing layer G in regions corresponding to the four gas flow allowing regions P (first gas flow allowing region P1 to fourth gas flow allowing region P4).

In the electrochemical element Q according to the present embodiment, the electrolyte layer B is arranged between the electrode layer A and the counter electrode layer C, and therefore an electrochemical reaction can occur between a substance supplied to the electrode layer A through the four gas flow allowing regions P (first gas flow allowing region P1 to fourth gas flow allowing region P4) and a substance supplied to the counter electrode layer C. Accordingly, it is understood that the first electrochemical reaction portion R1 is constituted by the first counter electrode layer C1 and the portions sandwiched between the first gas flow allowing region P1 and the first counter electrode layer C1 in the electrode layer A, the intermediate layer F, the electrolyte layer B, and the reaction preventing layer G.

It is understood that the second electrochemical reaction portion R2 is constituted by the second counter electrode layer C2 and the portions sandwiched between the second gas flow allowing region P2 and the second counter electrode layer C2 in the electrode layer A, the intermediate layer F, the electrolyte layer B, and the reaction preventing layer G.

It is understood that the third electrochemical reaction portion R3 is constituted by the third counter electrode layer C3 and the portions sandwiched between the third gas flow allowing region P3 and the third counter electrode layer C3 in the electrode layer A, the intermediate layer F, the electrolyte layer B, and the reaction preventing layer G.

It is understood that the fourth electrochemical reaction portion R4 is constituted by the fourth counter electrode layer C4 and the portions sandwiched between the fourth gas flow allowing region P4 and the fourth counter electrode layer C4 in the electrode layer A, the intermediate layer F, the electrolyte layer B, and the reaction preventing layer G.

In other words, in the present embodiment, multiple electrochemical reaction portions R are arranged on the upper side 4 of the metal substrate 1.

As described above, in the present embodiment, the diffusion preventing film 6 that has electrical conductivity is formed on the upper surface of the metal substrate 1. Accordingly, the electrode layers A, which are formed with gaps therebetween, are electrically connected via the metal substrate 1. In other words, in the present embodiment, the electrode layers A of adjacent electrochemical reaction portions R are electrically connected, thus electrically connecting the electrochemical reaction portions R in parallel.

Twenty-Third Embodiment

Figure 23:
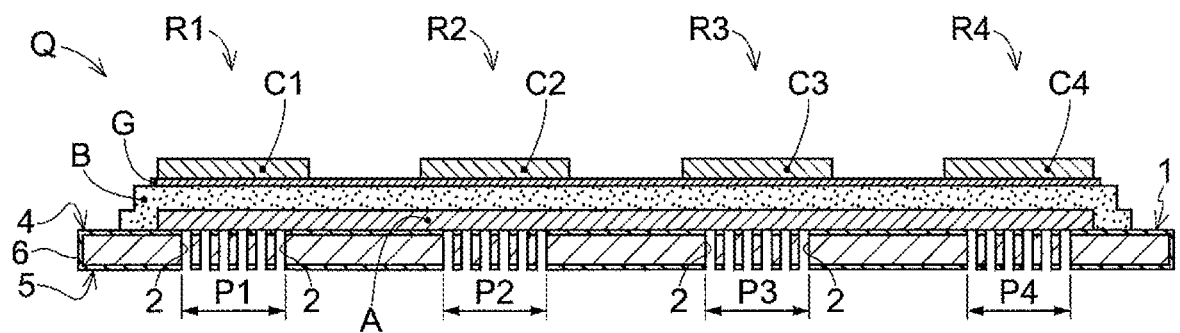
FIG. 23 is a cross-sectional view of a structure of the electrochemical element.

FIG. 23 shows an electrochemical element Q according to the present embodiment. The electrochemical element Q according to the present embodiment is configured to have the metal substrate 1, an electrode layer A, an electrolyte layer B, a reaction preventing layer G, and counter electrode layers C. Unlike the twenty-second embodiment, the intermediate layer F is not provided in the electrochemical reaction portions R of the present embodiment. In other words, the electrochemical reaction portions R of the present embodiment are each configured to have an electrode layer A, an electrolyte layer B, a reaction preventing layer G, and a counter electrode layer C. With the exception of the intermediate layer F, the configuration is similar to that of the twenty-second embodiment.

The electrolyte layer B is formed as a single continuous layer that covers the entirety of the electrode layer A. The four gas flow allowing regions P (first gas flow allowing region P1 to fourth gas flow allowing region P4) and the electrode layer A are covered by the electrolyte layer B. Accordingly, this suppresses the case where the gas supplied to the electrode layers A leaks to the counter electrode layers C.

In the present embodiment, similarly to the twenty-second embodiment, four electrochemical reaction portions R (first electrochemical reaction portion R1 to fourth electrochemical reaction portion R4) are arranged on the upper side 4 of the metal substrate 1. The electrode layers A of adjacent electrochemical reaction portions R are electrically connected via the metal substrate 1, thus electrically connecting the electrochemical reaction portions R in parallel.

Twenty-Fourth Embodiment

Figure 24:
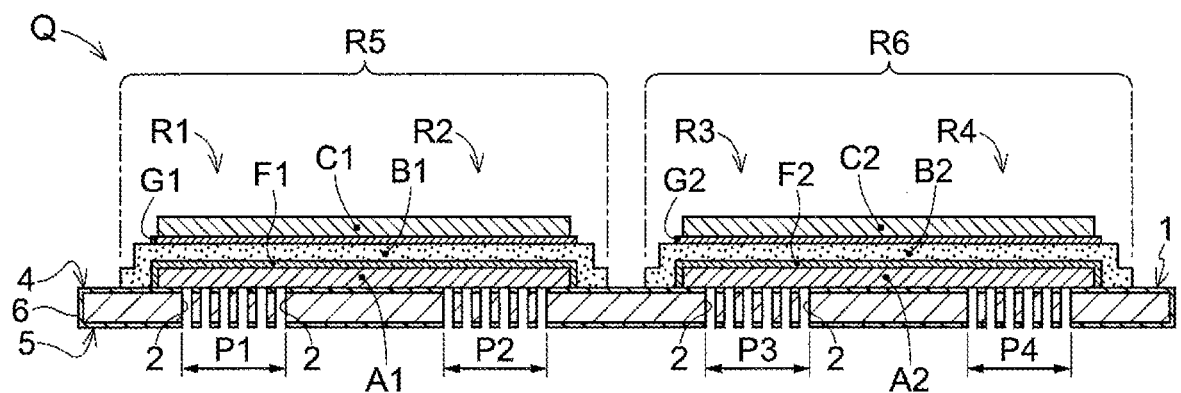
FIG. 24 is a cross-sectional view of a structure of the electrochemical element.

FIG. 24 shows an electrochemical element Q according to the present embodiment. The electrochemical element Q according to the present embodiment is configured to have the metal substrate 1, electrode layers A, intermediate layers F, electrolyte layers B, reaction preventing layers G, and counter electrode layers C. The electrode layers A, the intermediate layers F, the electrolyte layers B, the reaction preventing layers G, and the counter electrode layers C constitute electrochemical reaction portions R.

The configuration of the electrochemical element Q according to the present embodiment is similar to that of the nineteenth embodiment. A difference from the nineteenth embodiment is that the electrode layer A and the intermediate layer F are provided spanning multiple gas flow allowing regions P.

The first electrode layer A1 is formed as a single continuous layer that covers the entirety of the first gas flow allowing region P1 and the second gas flow allowing region P2. The first intermediate layer F1 is formed as a single continuous layer that covers the entirety of the first electrode layer A1.

The second electrode layer A2 is formed as a single continuous layer that covers the entirety of the third gas flow allowing region P3 and the fourth gas flow allowing region P4. The second intermediate layer F2 is formed so as to cover the entirety of the second electrode layer A2.

The first electrolyte layer B1 is formed as a single continuous layer that covers the entirety of the first electrode layer A1. Two gas flow allowing regions P (first gas flow allowing region P1 and second gas flow allowing region P2) and the first electrode layer A1 are covered by the first electrolyte layer B1. Accordingly, this suppresses the case where the gas supplied to the electrode layers A leaks to the counter electrode layers C.

The second electrolyte layer B2 is formed as a single continuous layer that covers the entirety of the second electrode layer A2. Two gas flow allowing regions P (third gas flow allowing region P3 and fourth gas flow allowing region P4) and the second electrode layer A2 are covered by the second electrolyte layer B2. Accordingly, this suppresses the case where the gas supplied to the electrode layers A leaks to the counter electrode layers C.

In the electrochemical element Q according to the present embodiment, the electrolyte layer B is arranged between the electrode layer A and the counter electrode layer C, and therefore an electrochemical reaction can occur between a substance supplied to the electrode layer A through the four gas flow allowing regions P (first gas flow allowing region P1 to fourth gas flow allowing region P4) and a substance supplied to the counter electrode layer C. Accordingly, it is understood that the first electrochemical reaction portion R1 is constituted by the portion of the electrode layer A, the portion of the intermediate layer F, the portion of the electrolyte layer B, the portion of the reaction preventing layer G, and the portion of the counter electrode layer C that are on the first gas flow allowing region P1.

It is understood that the second electrochemical reaction portion R2 is constituted by the portion of the electrode layer A, the portion of the intermediate layer F, the portion of the electrolyte layer B, the portion of the reaction preventing layer G, and the portion of the counter electrode layer C that are on the second gas flow allowing region P2.

It is understood that the third electrochemical reaction portion R3 is constituted by the portion of the electrode layer A, the portion of the intermediate layer F, the portion of the electrolyte layer B, the portion of the reaction preventing layer G, and the portion of the counter electrode layer C that are on the third gas flow allowing region P3.

It is understood that the fourth electrochemical reaction portion R4 is constituted by the portion of the electrode layer A, the portion of the intermediate layer F, the portion of the electrolyte layer B, the portion of the reaction preventing layer G, and the portion of the counter electrode layer C that are on the fourth gas flow allowing region P4.

In other words, in the present embodiment, multiple electrochemical reaction portions R are arranged on the upper side 4 of the metal substrate 1.

Also, in the present embodiment, the two counter electrode layers C are formed with gaps therebetween. An electrochemical reaction can occur due to the two counter electrode layers C (first counter electrode layer C1 and second counter electrode layer C2), the electrolyte layers B (first electrolyte layer B1 and second electrolyte layer B2), and the electrode layers A (first electrode layer A1 and second electrode layer A2). Accordingly, it is understood that the fifth electrochemical reaction portion R5 is constituted by the first electrode layer A1, the first counter electrode layer C1, and the portion sandwiched therebetween (first intermediate layer F1, first electrolyte layer B1, and first reaction preventing layer G1).

It is understood that the sixth electrochemical reaction portion R6 is constituted by the second electrode layer A2, the second counter electrode layer C2, and the portion sandwiched therebetween (second intermediate layer F2, second electrolyte layer B2, and second reaction preventing layer G2).

In other words, in the present embodiment, multiple electrochemical reaction portions R are arranged on the upper side 4 of the metal substrate 1.

Twenty-Fifth Embodiment

Figure 25:
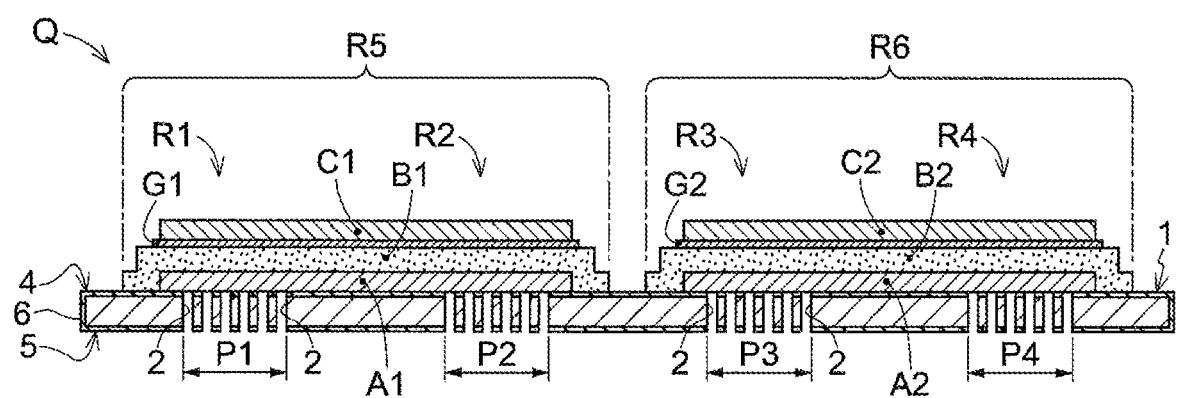
FIG. 25 is a cross-sectional view of a structure of the electrochemical element.

FIG. 25 shows an electrochemical element Q according to the present embodiment. The electrochemical element Q according to the present embodiment is configured to have the metal substrate 1, electrode layers A, electrolyte layers B, reaction preventing layers G, and counter electrode layers C. Unlike the nineteenth embodiment, the intermediate layers F are not provided in the electrochemical reaction portions R of the present embodiment. In other words, the electrochemical reaction portions R of the present embodiment are each configured to have an electrode layer A, an electrolyte layer B, a reaction preventing layer G, and a counter electrode layer C. With the exception of the intermediate layer F, the configuration is similar to that of the twenty-fourth embodiment.

The first electrolyte layer B1 is formed as a single continuous layer that covers the entirety of the first electrode layer A1. Two gas flow allowing regions P (first gas flow allowing region P1 and second gas flow allowing region P2) and the first electrode layer A1 are covered by the first electrolyte layer B1. Accordingly, this suppresses the case where the gas supplied to the electrode layers A leaks to the counter electrode layers C.

The second electrolyte layer B2 is formed as a single continuous layer that covers the entirety of the second electrode layer A2. Two gas flow allowing regions P (third gas flow allowing region P3 and fourth gas flow allowing region P4) and the second electrode layer A2 are covered by the second electrolyte layer B2. Accordingly, this suppresses the case where the gas supplied to the electrode layers A leaks to the counter electrode layers C.

In the electrochemical element Q according to the present embodiment, the electrolyte layer B is arranged between the electrode layer A and the counter electrode layer C, and therefore an electrochemical reaction can occur between a substance supplied to the electrode layer A through the four gas flow allowing regions P (first gas flow allowing region P1 to fourth gas flow allowing region P4) and a substance supplied to the counter electrode layer C. Accordingly, it is understood that the first electrochemical reaction portion R1 is constituted by the portion of the electrode layer A, the portion of the electrolyte layer B, the portion of the reaction preventing layer G, and the portion of the counter electrode layer C that are on the first gas flow allowing region P1.

It is understood that the second electrochemical reaction portion R2 is constituted by the portion of the electrode layer A, the portion of the electrolyte layer B, the portion of the reaction preventing layer G, and the portion of the counter electrode layer C that are on the second gas flow allowing region P2.

It is understood that the third electrochemical reaction portion R3 is constituted by the portion of the electrode layer A, the portion of the electrolyte layer B, the portion of the reaction preventing layer G, and the portion of the counter electrode layer C that are on the third gas flow allowing region P3.

It is understood that the fourth electrochemical reaction portion R4 is constituted by the portion of the electrode layer A, the portion of the electrolyte layer B, the portion of the reaction preventing layer G, and the portion of the counter electrode layer C that are on the fourth gas flow allowing region P4.

In other words, in the present embodiment, multiple electrochemical reaction portions R are arranged on the upper side 4 of the metal substrate 1.

Also, in the present embodiment, the two counter electrode layers C are formed with gaps therebetween. An electrochemical reaction can occur due to the two counter electrode layers C (first counter electrode layer C1 and second counter electrode layer C2), the electrolyte layers B (first electrolyte layer B1 and second electrolyte layer B2), and the electrode layers A (first electrode layer A1 and second electrode layer A2). Accordingly, it is understood that the fifth electrochemical reaction portion R5 is constituted by the first electrode layer A1, the first counter electrode layer C1, and the portion sandwiched therebetween (first electrolyte layer B1 and first reaction preventing layer G1).

It is understood that the sixth electrochemical reaction portion R6 is constituted by the second electrode layer A2, the second counter electrode layer C2, and the portion sandwiched therebetween (second electrolyte layer B2 and second reaction preventing layer G2).

In other words, in the present embodiment, multiple electrochemical reaction portions R are arranged on the upper side 4 of the metal substrate 1.

Twenty-Sixth Embodiment

Figure 26:
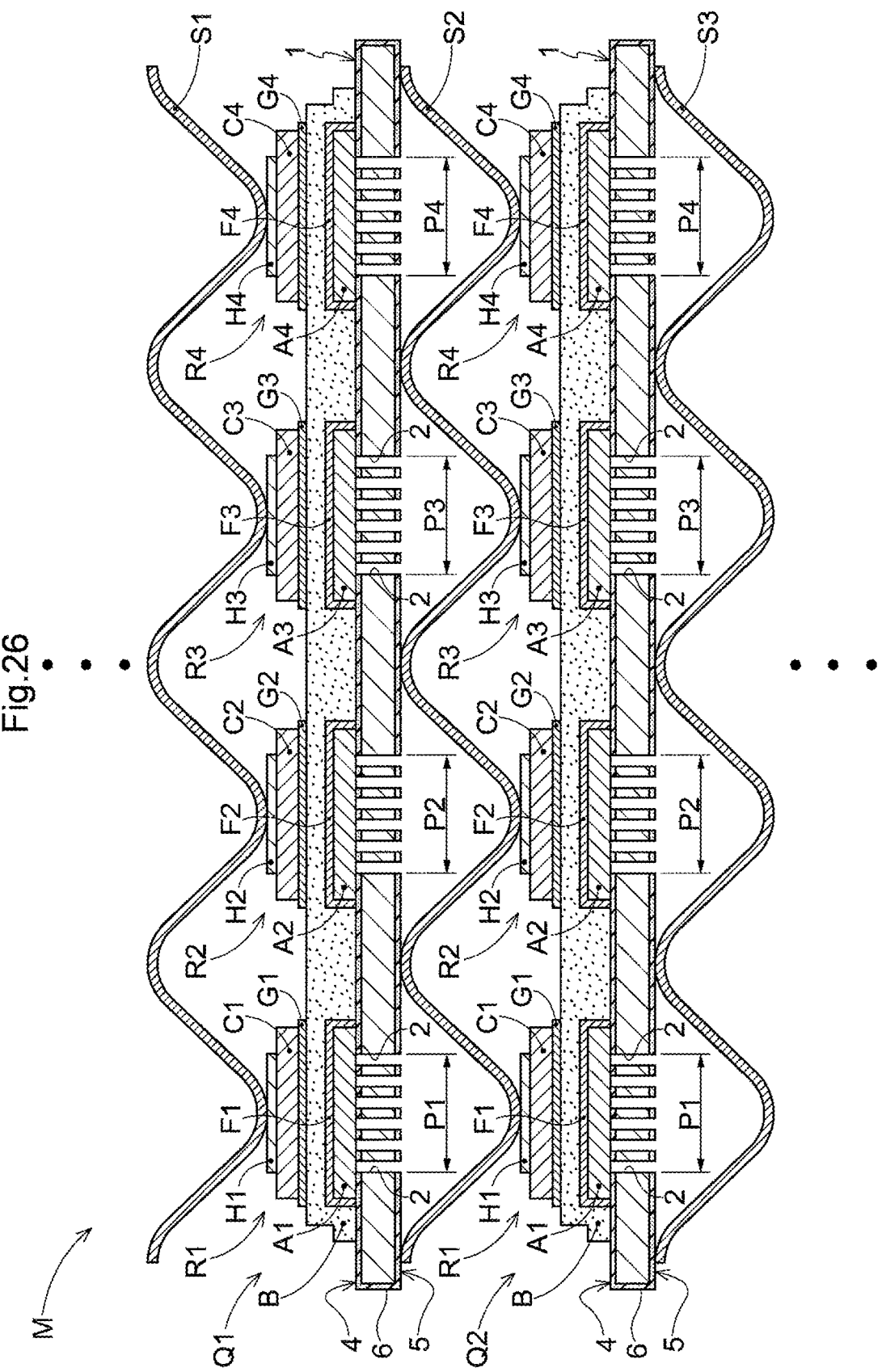
FIG. 26 is a cross-sectional view of a structure of the electrochemical module.

FIG. 26 shows an electrochemical module M according to the present embodiment. The electrochemical module M according to the present embodiment is a module obtained by arranging any of the above-described electrochemical elements Q in a stacked state. The electrochemical module M according to the twenty-sixth embodiment uses the electrochemical element Q according to any of the eleventh to twenty-fifth embodiments, that is to say an electrochemical element Q in which multiple electrochemical reaction portions R are electrically connected in parallel.

The electrochemical module M is configured to have multiple electrochemical elements Q (Q1, Q2, etc.) and multiple current collection plates S (S1, S2, etc.). In the present embodiment, the electrochemical element Q will be described as having the same configuration as that in the eleventh embodiment. In each electrochemical element Q, the electrode layers A of the respective electrochemical reaction portions R are physically separate from one another, and the counter electrode layers C of the respective electrochemical reaction portions R are physically separate from one another.

In the present embodiment, a current collection layer H is provided on the counter electrode layer C of the electrochemical element Q. In each electrochemical element Q, the current collection layers H of the respective electrochemical reaction portions R are physically separate from one another, and the current collection layer H is on and/or over the counter electrode layer C and is not in direct physical contact with the electrolyte layer B. The current collection layer H is made of a ceramic paste, a metal felt material, or the like that has excellent electrical conductivity.

The current collection plate S is a metallic plate formed with a wavy shape. The material making the current collection plate S can be the same as that of the above-described metal substrate 1. Also, if a diffusion preventing film similar to that of the metal substrate 1 is formed on the upper surface of the current collection plate S, it is possible to suppress Cr dispersion, and therefore this is favorable. The current collection plate S having the above configuration can be manufactured at low-cost by press molding or the like. Note that the current collection plate S is constituted by a material that does not transmit a gas so as to be able to prevent the flow of a gas between the upper side and the lower side.

As shown in FIG. 26, the electrochemical elements Q and the current collection plates S are stacked in an alternating arrangement. The upper tips in the wavy shape of one current collection plate S are electrically conductively joined to the lower side 5 of one metal substrate 1. This joining is performed by, for example, applying a ceramic paste or the like that has excellent electrical conductivity, and biasing the current collection plate S toward the metal substrate 1. The joining is performed by welding, brazing, or the like.

The lower tips in the wavy shape of one current collection plate S are electrically conductively joined to the current collection layers H of the electrochemical elements Q. This joining is performed by, for example, sintering the ceramic paste of the above-described current collection layers H, or biasing a metal felt to the current collection plate S.

According to the above configuration, the current collection plate S is electrically connected to the metal substrate 1 of the electrochemical element Q1 and the current collection layers H of the electrochemical element Q2. Accordingly, the electrode layers A of the electrochemical element Q1 and the counter electrode layers C of the electrochemical element Q2 are electrically connected to each other. In other words, the electrochemical reaction portions R of the electrochemical element Q1 and the electrochemical reaction portions R of the electrochemical element Q2 are electrically connected in series.

When multiple electrochemical elements Q and multiple current collection plates S are stacked in the manner shown in FIG. 26, each current collection plate S is electrically connected to the metal substrate 1 of one electrochemical element Q and the current collection layers H of the electrochemical element Q arranged below. Accordingly, the electrode layers A of the one electrochemical element Q are electrically connected to the counter electrode layers C of the electrochemical element Q therebelow. In other words, in the electrochemical module M according to the present embodiment, the electrochemical reaction portions R of respective electrochemical elements Q are electrically connected in series by the current collection plates S.

As described above, in the electrochemical element Q, multiple electrochemical reaction portions R are arranged on the upper side 4 of the metal substrate 1. Also, the electrochemical reaction portions R (first electrochemical reaction portion R1 to four electrochemical reaction portion R4) are electrically connected in parallel. Accordingly, in the electrochemical module M according to the present embodiment, the electrochemical reaction portions R in each electrochemical element Q are electrically connected in parallel, and the electrochemical reaction portions R of respective electrochemical elements Q are electrically connected in series by the current collection plates S.

Other Embodiments (1) In the first embodiment and the second embodiment described above, the insulating film is formed on the upper surface of the metal substrate 1, but a configuration is also possible in which, in the case where a metal material is used in a member other than the metal substrate 1 in connection with the formation of the electrochemical element Q or the electrochemical module M, such as the U-shaped member 11 or the cover portion 12 that forms the tubular gas flowing portion 10, an insulating film and a diffusion preventing film are formed on the upper surface of that metal material.

(2) In the embodiments described above, the electrode layer A is arranged between the metal substrate 1 and the electrolyte layer B, and the counter electrode layer C is arranged on the opposite of the metal substrate 1 from the perspective of the electrolyte layer B. A configuration is also possible in which the electrode layer A and the counter electrode layer C are provided in an inversed arrangement. Specifically, a configuration is also possible in which the counter electrode layer C is arranged between the metal substrate 1 and the electrolyte layer B, and the electrode layer A is arranged on the opposite side of the metal substrate 1 from the perspective of the electrolyte layer B. In this case, a change also needs to be made regarding the supply of gas to the electrochemical elements Q. For example, in the case of causing the electrochemical elements Q to operate as a fuel cell, oxygen is supplied to the counter electrode layer C via a gas flow allowing region P of the metal substrate 1, and hydrogen is supplied to the electrode layer A in the region surrounding the electrochemical element Q.

(3) In the embodiments described above, five (or four) electrochemical reaction portions R are provided on the metal substrate 1. The number of electrochemical reaction portions R is not limited to this, and need only be two or more.

(4) In the embodiments described above, the electrochemical reaction portions R are provided in one or two rows on the metal substrate 1. The number of rows of electrochemical reaction portions R is not limited to this, and may be three or more.

(5) Although the above-described seventh embodiment illustrates an aspect in which multiple sets of series-connected electrochemical reaction portions R are connected in parallel, a configuration is possible in which multiple sets of series-connected electrochemical reaction portions R are connected in series. Also, a configuration is possible in which some sets of series-connected electrochemical reaction portions R are connected in series, and other sets are connected in parallel.

(6) Although the above-described eighth embodiment illustrates an aspect in which multiple sets of parallel-connected electrochemical reaction portions R are connected in series, a configuration is possible in which multiple sets of parallel-connected electrochemical reaction portions R are connected in parallel. Also, a configuration is possible in which some sets of parallel-connected electrochemical reaction portions R are connected in series, and other sets are connected in parallel.

(7) Some electrochemical reaction portions R may be connected in series and others may be connected in parallel in the same electrochemical element Q. For example, the electrochemical element Q may have a configuration in which electrochemical reaction portions R are formed in four rows and four columns on the metal substrate 1, the four electrochemical reaction portions R in each row are connected in series, and the electrochemical reaction portions R at the two ends of each row are connected in parallel. Note that the electrochemical reaction portions R that are connected in both series and parallel may be applied in aspects (5) and (6) described above.

(8) The above-described embodiments illustrate flat plate-shaped electrochemical elements and electrochemical modules, but the electrochemical element and the electrochemical module of the present invention may be cylindrical or disk-shaped.

Figure 27:
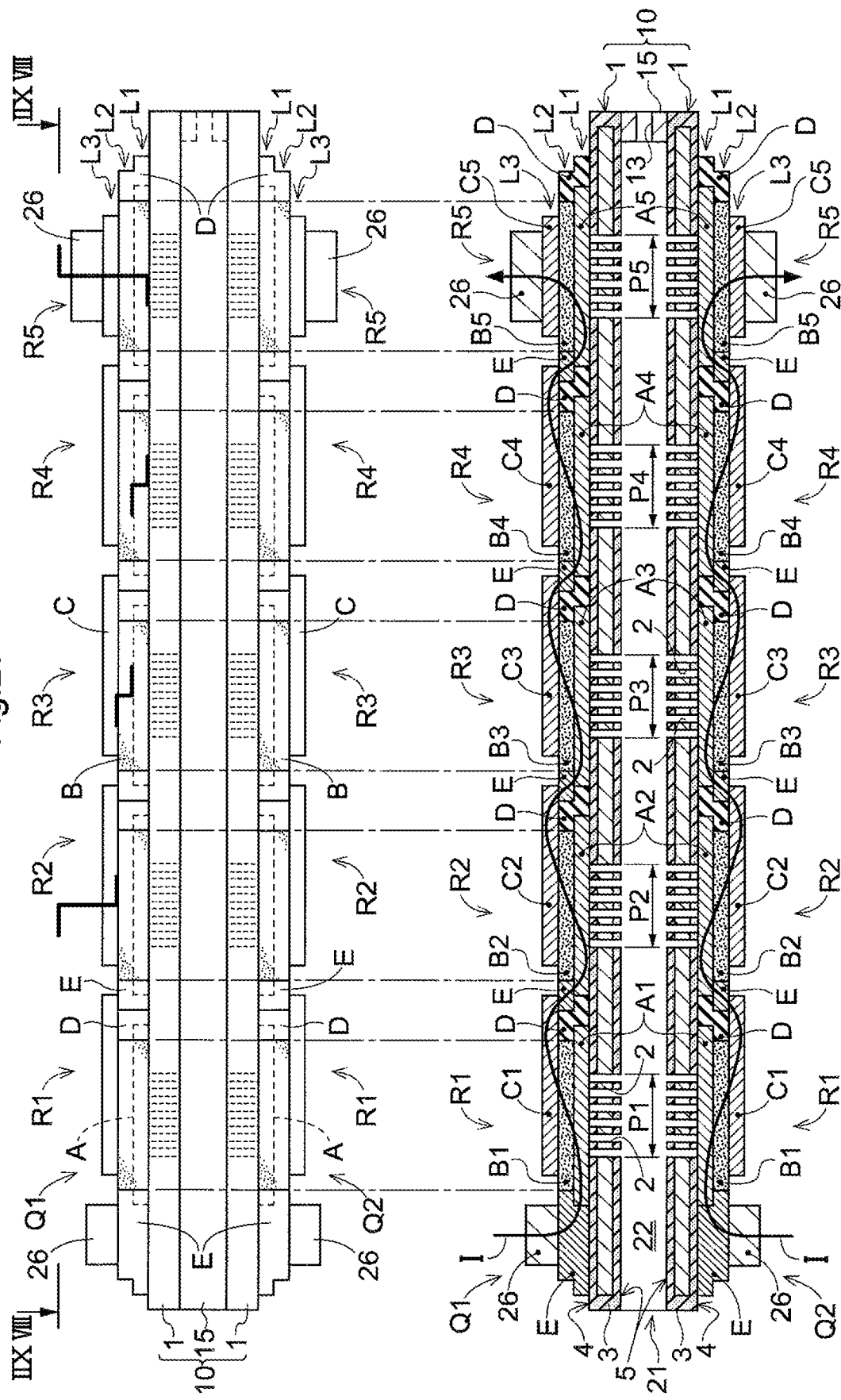
FIG. 27 is a front view and a cross-sectional view of a structure of the electrochemical element.
Figure 28:
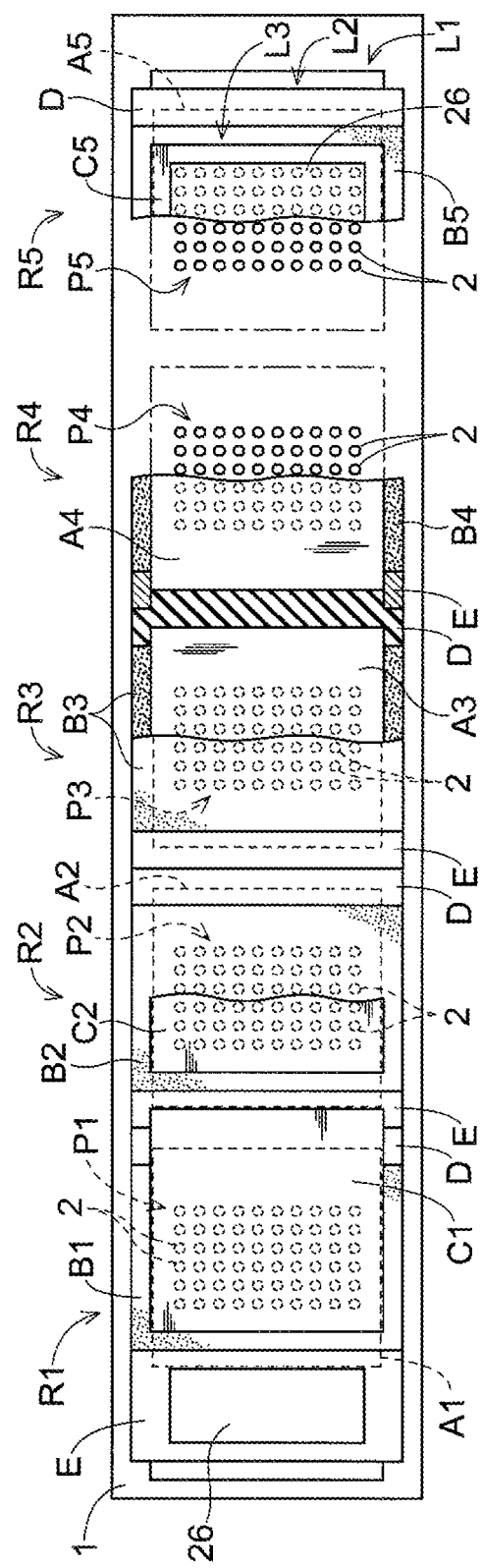
FIG. 28 is a top view of a structure of the electrochemical element.

(9) The above-described first and second embodiments illustrate aspects of the electrochemical element in which the U-shaped member 11 and the cover portion 12 are joined to the metal substrate 1 to form the tubular gas flowing portion 10, but the tubular gas flowing portion 10 may be formed with use of multiple metal substrates 1. FIGS. 27 and 28 show an example in which two side surface joining members 15 and a cover portion 12 are joined to two metal substrates 1 to form the tubular gas flowing portion 10. The side surface joining members 15 are rectangular members. The long sides of the two metal substrates 1 are joined to the long sides of the two side surface joining members 15, the end portion on one side of the formed tube is blocked by the cover portion 12. Accordingly, the tubular gas flowing portion 10 is configured with a flat plate shape or a flat bar shape overall, with an internal space 22 inside. The metal substrates 1 are arranged parallel with the central axis of the tubular gas flowing portion 10, and electrochemical reaction portions are provided on both surfaces of the electrochemical elements.

An electrochemical module M similar to that shown in the seventh embodiment described above can be constituted with use of this electrochemical element Q.

(10) In the embodiments described above, the through holes 2 that penetrate the upper side 4 and the lower side 5 of the metal substrate 1 need only form passages that enable the flow of a gas between the upper side 4 and the lower side 5, and the arrangement thereof is not limited to an arrangement in which the through holes 2 are formed at the positions of intersections of grid lines that are parallel to the long sides and the short sides as shown in FIGS. 1 to 4, and furthermore there is no limitation to circular holes that extend orthogonal to the plate surfaces of the metal substrate 1 as shown in FIGS. 1 to 4 and 11 to 26. The through holes 2 are not required to have a constant diameter, and may have a tapered shape. Also, the through holes 2 may have a bent shape.

Figure 29:
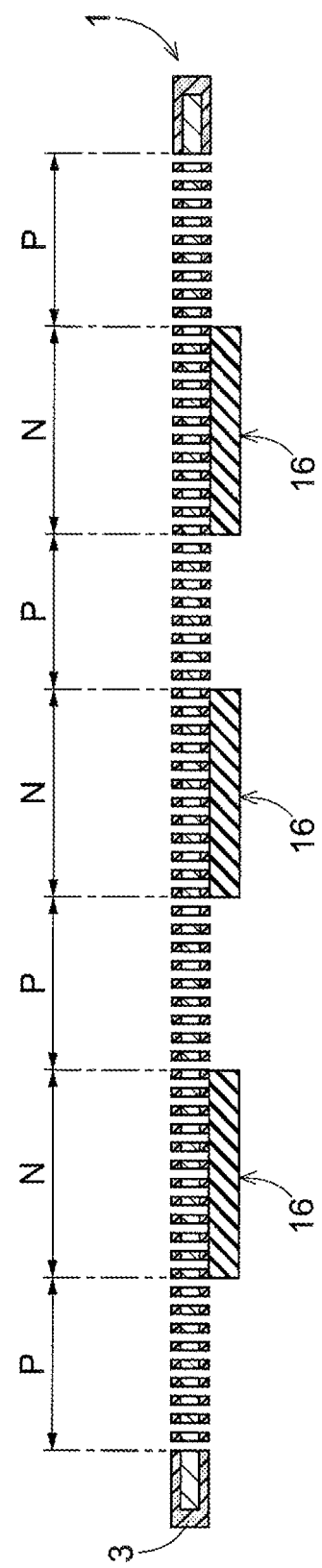
FIG. 29 is a cross-sectional view of a structure of a metal substrate.

(11) Although the above-described embodiments illustrate cases where the gas flow prohibiting region is constituted by providing a region where through holes are not formed, but a configuration is possible in which the gas flow prohibiting region is constituted by first forming through holes, and then blocking at least some of the through holes. The through holes may be blocked by, for example, a method of filling the through holes with an air-tight material, or a method in which a blocking member 16 not provided with through holes is joined to or placed on one surface of the metal substrate as shown in FIG. 29.

Figure 30:
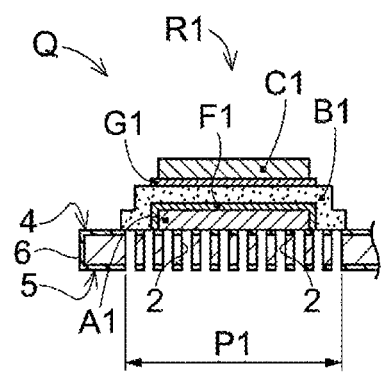
FIG. 30 is a cross-sectional view of a structure of the electrochemical element.

(12) In the first, third, and eleventh to twenty-sixth embodiments described above, the gas flow allowing regions P are arranged so as to be covered by the electrode layer A, but it is sufficient that, as shown in FIG. 30 (which shows only a single electrochemical reaction portion), the electrolyte layer B is arranged so as to cover at least the gas flow allowing regions P or the electrode layers A provided in the gas flow allowing regions P. Accordingly, it is possible to suppress the case where the gas supplied from the lower side of the metal substrate to the electrode layer via the gas flow allowing regions leaks to the upper side of the metal substrate, and it is possible to raise the performance and the reliability of the electrochemical element.

(13) The above-described embodiments illustrate examples in which the electrochemical elements Q are arranged in a stacked state, that is to say a grouped state, in the electrochemical module M. An aspect of the electrochemical module M is possible in which the electrochemical element Q are grouped in a non-stacked state.

(14) The electrochemical element may be configured as described below. An electrochemical element having a metal substrate and multiple electrochemical reaction portions, wherein the metal substrate has a gas flow allowing region that allows flowing of a gas between the upper side and the lower side of the metal substrate, the electrochemical reaction portion has at least an electrode layer, an electrolyte layer, and a counter electrode layer, and is arranged on the upper side of the metal substrate, the electrolyte layer is arranged between the electrode layer and the counter electrode layer, and the gas flowing through the gas flow allowing region is supplied to the electrode layer.

(15) Furthermore, the electrochemical element may be configured as described below. The metal substrate has multiple gas flow allowing regions that are separated from each other, and the electrolyte layer of the electrochemical reaction portion is arranged so as to cover the entirety of each of the gas flow allowing regions.

(16) Furthermore, the electrochemical element may be configured as described below. The metal oxide film is an oxide of a metal element contained in the metal substrate.

The configurations disclosed in each of the embodiments described above (including the alternative embodiments; the same applies to the following) can be applied in combination with configurations disclosed in other embodiments as long as no contradiction arises. Also, the embodiments disclosed in this specification are illustrative, embodiments of the present invention are not limited to the disclosed embodiments, and appropriate modifications can be made without departing from the object of the present invention.

DESCRIPTION OF REFERENCE SIGNS 1 metal substrate
3 insulating film (metal oxide film)

4 upper side
5 lower side
6 diffusion preventing film (metal oxide film)
A electrode layer
B electrolyte layer
C counter electrode layer
M electrochemical module
N gas flow prohibiting region
P gas flow allowing region
Q electrochemical element
R electrochemical reaction portion
Y electrochemical device
Z energy system

The invention claimed is:

1. An electrochemical module including a plurality of electrochemical elements in a stacked state, each of the electrochemical elements comprising a metal substrate and a plurality of electrochemical reaction portions on and/or over an upper side of the metal substrate,
wherein the metal substrate has a gas flow allowing region that allows flowing of a gas between the upper side and a lower side of the metal substrate,
each electrochemical reaction portion has at least an electrode layer, an electrolyte layer, a counter electrode layer, and a current collection layer, and is arranged on and/or over the upper side of the metal substrate,
the electrolyte layer is arranged at least between the electrode layer and the counter electrode layer,
the current collection layer is on and/or over the counter electrode layer and is not in direct physical contact with the electrolyte layer,
the gas flowing through the gas flow allowing region is supplied to the electrode layer,
the counter electrode layer is supplied with a different type of gas from the gas supplied to the electrode layer,
the plurality of electrochemical reaction portions are electrically connected in parallel,
in the electrochemical module, the plurality of electrochemical elements and current collection plates are stacked in an alternating arrangement,
the current collection plates are metallic plates with a wavy shape,
a lower tip in the wavy shape of the current collection plate is joined to the current collection layer of one of the plurality of electrochemical elements adjacent a lower side of the current collection plate,
in each electrochemical element, the electrode layers of the respective electrochemical reaction portions are physically separate from one another,
in each electrochemical element, the counter electrode layers of the respective electrochemical reaction portions are physically separate from one another, and
in each electrochemical element, the current collection layers of the respective electrochemical reaction portions are physically separate from one another.

2. The electrochemical module according to claim 1, wherein the metal substrate has a plurality of the gas flow allowing regions that are separated from each other, and the electrolyte layer of the electrochemical reaction portion is arranged so as to cover at least each of the gas flow allowing regions or the electrode layers provided in the gas flow allowing regions.

3. The electrochemical module according to claim 1, wherein on and/or over the upper side of the metal substrate, a metal oxide film is formed in at least a region where the metal substrate and the electrode layer are in contact.

4. The electrochemical module according to claim 1, wherein on and/or over the upper side of the metal substrate, a metal oxide film is formed in at least a region that is covered by neither the electrode layer, the electrolyte layer, nor the counter electrode layer.

5. The electrochemical module according to claim 3, wherein the metal oxide film is an oxide that contains at least a metal element included in the metal substrate.

6. An electrochemical device, comprising:
at least the electrochemical module according to claim 1 and a reformer, and comprising a fuel supply unit that supplies a fuel gas containing a reducible component to the electrochemical module,
wherein the fuel gas containing the reducible component is either the gas flowing through the gas flow allowing region and supplied to the electrode layer, or the different type of gas from the gas supplied to the electrode layer that is supplied to the counter electrode layer.

7. An electrochemical device, comprising:
at least the electrochemical module according to claim 1, and comprising an inverter that extracts electrical power from the electrochemical module.

8. An energy system comprising:
the electrochemical device according to claim 6, and a waste heat management unit that reuses heat discharged from the electrochemical device.

9. The electrochemical module according to claim 1, wherein
the electrolyte layer is a gas-tight layer, and
the electrolyte layer of the electrochemical reaction portion is disposed so as to cover the electrode layer provided in the gas flow allowing region, or the electrolyte layer of the electrochemical reaction portion is disposed so as to cover the gas flow allowing region and the electrode layer provided in the gas flow allowing region.

10. The electrochemical module according to claim 1, wherein
the gas flowing through the gas flow allowing region is not supplied to the counter electrode layer.

11. An electrochemical module including a plurality of electrochemical elements in a stacked state, each of the electrochemical elements comprising a metal substrate and a plurality of electrochemical reaction portions on and/or over an upper side of the metal substrate,
wherein the metal substrate has a gas flow allowing region that allows flowing of a gas between the upper side and a lower side of the metal substrate,
each electrochemical reaction portion has at least an electrode layer, an electrolyte layer, a counter electrode layer, and a current collection layer, and is arranged on and/or over the upper side of the metal substrate,
the electrolyte layer is arranged at least between the electrode layer and the counter electrode layer,
the current collection layer is on and/or over the counter electrode layer and is not in direct physical contact with the electrolyte layer,
the gas flowing through the gas flow allowing region is supplied to the electrode layer,
the gas flowing through the gas flow allowing region is not supplied to the counter electrode layer,
the plurality of electrochemical reaction portions are electrically connected in parallel,
in the electrochemical module, the plurality of electrochemical elements and current collection plates are stacked in an alternating arrangement, the current collection plates are metallic plates with a wavy shape, a lower tip in the wavy shape of the current collection plate is joined to the current collection layer of one of the plurality of electrochemical elements adjacent a lower side of the current collection plate, in each electrochemical element, the electrode layers of the respective electrochemical reaction portions are physically separate from one another, in each electrochemical element, the counter electrode layers of the respective electrochemical reaction portions are physically separate from one another, and in each electrochemical element, the current collection layers of the respective electrochemical reaction portions are physically separate from one another.

12. An electrochemical module including a plurality of electrochemical elements in a stacked state, each of the electrochemical elements comprising a metal substrate and a plurality of electrochemical reaction portions on and/or over an upper side of the metal substrate, wherein the metal substrate has a gas flow allowing region that allows flowing of a gas between the upper side and a lower side of the metal substrate, each electrochemical reaction portion has at least an electrode layer, an electrolyte layer, a counter electrode layer, and a current collection layer, and is arranged on and/or over the upper side of the metal substrate, the electrolyte layer which is gas-tight is arranged at least between the electrode layer and the counter electrode layer, the current collection layer is on and/or over the counter electrode layer and is not in direct physical contact with the electrolyte layer, the gas flowing through the gas flow allowing region is supplied to the electrode layer, the plurality of electrochemical reaction portions are electrically connected in parallel, the electrolyte layer of the electrochemical reaction portion is disposed so as to cover the electrode layer provided in the gas flow allowing region, or the electrolyte layer of the electrochemical reaction portion is disposed so as to cover the gas flow allowing region and the electrode layer provided in the gas flow allowing region, in the electrochemical module, the plurality of electrochemical elements and current collection plates are stacked in an alternating arrangement, the current collection plates are metallic plates with a wavy shape, a lower tip in the wavy shape of the current collection plate is joined to the current collection layer of one of the plurality of electrochemical elements adjacent a lower side of the current collection plate, in each electrochemical element, the electrode layers of the respective electrochemical reaction portions are physically separate from one another, in each electrochemical element, the counter electrode layers of the respective electrochemical reaction portions are physically separate from one another, and in each electrochemical element, the current collection layers of the respective electrochemical reaction portions are physically separate from one another.

13. The electrochemical module according to claim 1, wherein at least one of upper tips in the wavy shape of the current collection plate is joined to a lower side of the metallic substrate.

14. The electrochemical module according to claim 1, wherein at least a part of an upper surface of the current collection plate is provided with a diffusion preventing film.

* * * * *